United States Patent
Sato et al.

(10) Patent No.: US 11,262,265 B2
(45) Date of Patent: Mar. 1, 2022

(54) TEMPERATURE CORRECTION DEVICE, SENSOR MODULE, AND TEMPERATURE CORRECTION METHOD

(71) Applicant: SEIKO EPSON CORPORATION, Tokyo (JP)

(72) Inventors: Kenta Sato, Shiojiri (JP); Yasushi Yoshikawa, Chino (JP)

(73) Assignee: Seiko Epson Corporation, Tokyo (JP)

(*) Notice: Subject to any disclaimer, the term of this patent is extended or adjusted under 35 U.S.C. 154(b) by 92 days.

(21) Appl. No.: 16/824,818

(22) Filed: Mar. 20, 2020

(65) Prior Publication Data

US 2020/0300722 A1    Sep. 24, 2020

(30) Foreign Application Priority Data

Mar. 22, 2019  (JP) .............................. JP2019-054470

(51) Int. Cl.
*G01L 19/04*        (2006.01)

(52) U.S. Cl.
CPC .................... *G01L 19/04* (2013.01)

(58) Field of Classification Search
CPC ..................................................... G01L 19/04
See application file for complete search history.

(56) References Cited

U.S. PATENT DOCUMENTS

| | | | | |
|---|---|---|---|---|
| 4,547,691 A | * | 10/1985 | Valdois | .................... G01K 7/32 310/338 |
| 5,394,345 A | * | 2/1995 | Berard | ................... G01L 9/0022 702/98 |
| 2014/0358317 A1 | | 12/2014 | Nishikawa et al. | |

FOREIGN PATENT DOCUMENTS

| | | | |
|---|---|---|---|
| CN | 103946672 | 7/2014 | |
| JP | H05-126647 | 5/1993 | |
| JP | H06-082111 | 3/1994 | |
| JP | H10-206177 | 8/1998 | |
| JP | H11-344735 | 12/1999 | |
| JP | 2002-277251 | 9/2002 | |
| JP | 2006-189353 | 7/2006 | |
| JP | 2010-085339 | 4/2010 | |
| JP | 2018-048859 | 3/2018 | |
| WO | WO-2007085934 A1 * | 8/2007 | ............. G01L 9/085 |

\* cited by examiner

*Primary Examiner* — Nguyen Q. Ha
(74) *Attorney, Agent, or Firm* — Workman Nydegger

(57) ABSTRACT

A temperature correction device includes a data acquisition portion that acquires physical quantity data based on an output signal from a physical quantity sensor and temperature data based on an output signal from a temperature sensor, a physical quantity measurement portion that measures a physical quantity detected by the physical quantity sensor based on the physical quantity data, a correction value calculation portion that calculates a correction value based on a product of a temperature gradient value for a first period from a first time to a second time obtained based on the temperature data and a correction coefficient value, and a correction portion that corrects a measurement value of the physical quantity measured by the physical quantity measurement portion based on the correction value.

9 Claims, 15 Drawing Sheets

TEMPERATURE CORRECTION DEVICE, SENSOR MODULE, AND TEMPERATURE CORRECTION METHOD

The present application is based on, and claims priority from JP Application Serial Number 2019-054470, filed Mar. 22, 2019, the disclosure of which is hereby incorporated by reference herein in its entirety.

BACKGROUND

1. Technical Field

The present disclosure relates to a temperature correction device, a sensor module, and a temperature correction method.

2. Related Art

Various systems in which data detected by a plurality of sensor modules installed in a structure are processed by a processing device to provide desired information are becoming widespread. In recent years, as an importance of infrastructure maintenance is increased, there is an increasing need to acquire high-precision data while using the sensor module in an outdoor environment, and when a temperature changes suddenly due to direct sunlight, snowfall, or the like, a data error may increase.

On the other hand, for example, in JP-A-11-344735, since an AF sensor of a distance measuring device changes in temperature with a transient characteristic with a change in an environmental temperature, when a rate of change of an output data of a temperature sensor is a predetermined value or greater, there is proposed a temperature correction device that estimates a temperature of the AF sensor based on the output data of the temperature sensor, calculates a correction value corresponding to the estimated temperature, and adds the correction value to distance measurement data.

However, in the temperature correction device described in JP-A-11-344735, although an error of the distance measurement data due to a temperature gradient between the temperature sensor and the AF sensor can be corrected with high accuracy, the error of the distance measurement data is indirectly corrected by estimating, that is, correcting the temperature of the AF sensor based on the output data of the temperature sensor. Therefore, it is difficult to accurately correct the error of the distance measurement data due to the temperature gradient inside the AF sensor.

SUMMARY

A temperature correction device according to an aspect of the present disclosure includes a data acquisition portion that acquires physical quantity data based on an output signal from a physical quantity sensor and temperature data based on an output signal from a temperature sensor, a physical quantity measurement portion that measures a physical quantity detected by the physical quantity sensor based on the physical quantity data, a correction value calculation portion that calculates a correction value based on a product of a temperature gradient value for a first period from a first time to a second time obtained based on the temperature data and a correction coefficient value, and a correction portion that corrects a measurement value of the physical quantity measured by the physical quantity measurement portion based on the correction value.

In the temperature correction device according to the aspect, the correction value calculation portion may calculate a temperature value at the first time and a temperature value at the second time based on a plurality of pieces of the temperature data acquired by the data acquisition portion in the first period, and may calculate the temperature gradient value for the first period based on a difference between the temperature value at the second time and the temperature value at the first time.

In the temperature correction device according to the aspect, the temperature value at the first time may be a sum of values of a plurality of pieces of the temperature data acquired by the data acquisition portion in a second period, and the temperature value at the second time may be a sum of values of a plurality of pieces of the temperature data acquired by the data acquisition portion in a third period.

In the temperature correction device according to the aspect, the correction value calculation portion may periodically calculate the correction value, and calculate k pieces of sub-correction values that monotonously increase or monotonously decrease for k pieces of sections into which a cycle for calculating the correction value is divided based on the correction value, where k is an integer of 2 or greater, and the correction portion may correct the measurement value of the physical quantity based on the k pieces of sub-correction values.

In the temperature correction device according to the aspect, when the correction value calculated in a cycle immediately before the cycle divided into the k pieces of sections is $\Delta C2(n)$, and the correction value calculated in a cycle immediately before the cycle in which $\Delta C2(n)$ is calculated is $\Delta C2(n-1)$, a m-th sub-correction value of the k pieces of sub-correction values may be $(\Delta C2(n)-\Delta C2(n-1))\times m/k+\Delta C2(n-1)$, where m is an integer from 1 to k.

In the temperature correction device according to the aspect, the correction coefficient value may be a polynomial value having a sum of values of a plurality of pieces of the temperature data acquired by the data acquisition portion in a fourth period as a variable.

In the temperature correction device according to the aspect, the polynomial when the temperature gradient value is in a first range and the polynomial when the temperature gradient value is in a second range may be different from each other.

A sensor module according to another aspect of the present disclosure includes the temperature correction device according to the aspect, and the physical quantity sensor.

In the sensor module according to the aspect, the physical quantity sensor may be an acceleration sensor.

A temperature correction method according to another aspect of the present disclosure includes a physical quantity data acquisition step of acquiring physical quantity data based on an output signal from a physical quantity sensor, a physical quantity measurement step of measuring a physical quantity detected by the physical quantity sensor based on the physical quantity data, a temperature data acquisition step of acquiring temperature data based on an output signal from a temperature sensor, a correction value calculation step of calculating a correction value based on a product of a temperature gradient value for a first period from a first time to a second time obtained based on the temperature data and a correction coefficient value, and a correction step of correcting a measurement value of the physical quantity measured in the physical quantity measurement step based on the correction value.

DESCRIPTION OF EXEMPLARY EMBODIMENTS

Hereinafter, an exemplary embodiment of the present disclosure will be described in detail with reference to the drawings. The embodiments described below do not unduly limit the contents of the present disclosure described in the aspects. In addition, not all of the configurations described below are essential constituent requirements of the present disclosure.

1. First Embodiment

1-1. Sensor Module Structure

First, an example of a sensor module structure used in a sensor system according to the present embodiment will be described.

Figure 1:
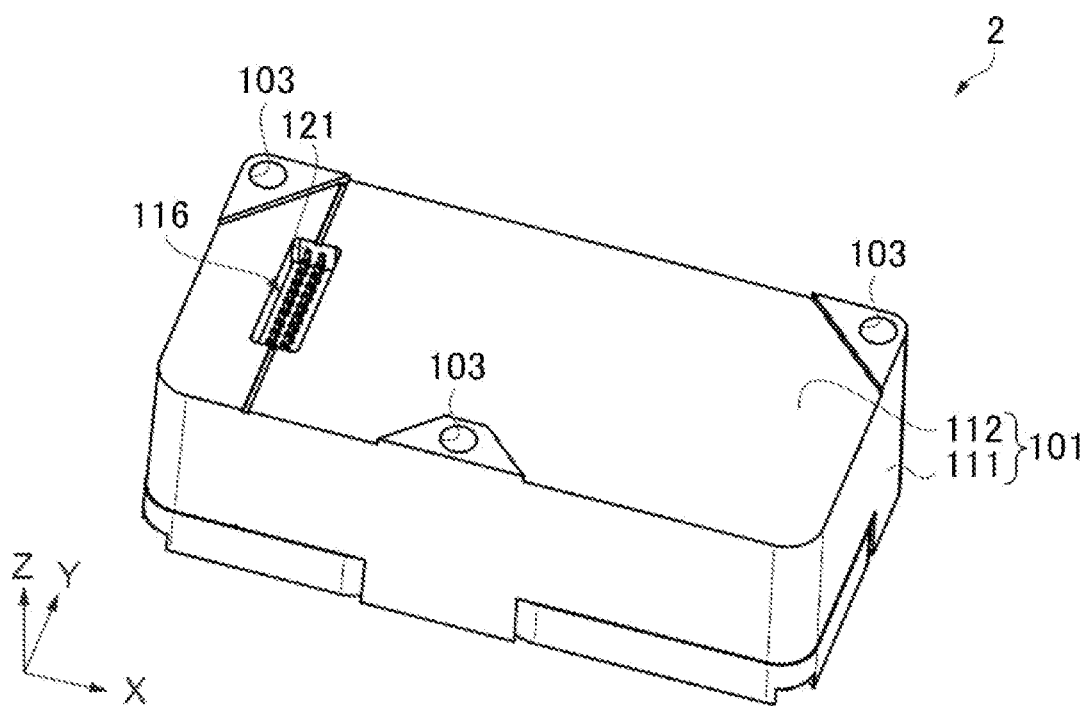
FIG. 1 is a perspective view of a sensor module.

FIG. 1 is a perspective view of a sensor module 2 when viewed from a mounting target surface side to which the sensor module 2 is fixed. In the following description, a direction along a long side of the sensor module 2 that forms a rectangle in a plan view will be described as an X axis direction, a direction orthogonal to the X axis direction in a plan view will be described as an Y axis direction, and a thickness direction of the sensor module 2 will be described as a Z axis direction.

The sensor module 2 is a rectangular parallelepiped having a rectangular planar shape, and has a long side along the X axis direction and a short side along the Y axis direction orthogonal to the X axis direction. Screw holes 103 are formed at two locations near each end portion of one long side and at one location in a central portion of the other long side. Each of the screw holes 103 at three locations is used in a state of being fixed to a mounting target surface of a mounting target body of a structure such as a building or a bulletin board via a fixing screw.

As illustrated in FIG. 1, an opening portion 121 is provided at a front surface of the sensor module 2 viewed from the mounting target surface side. A plug-type connector 116 is disposed inside the opening portion 121. The connector 116 has a plurality of pins arranged in two rows, and in each row, the plurality of pins are arranged in the Y axis direction. A socket-type connector (not illustrated) is coupled to the connector 116 from the mounting target body, and an electric signal such as a drive voltage of the sensor module 2 and detection data is transmitted and received.

Figure 2:
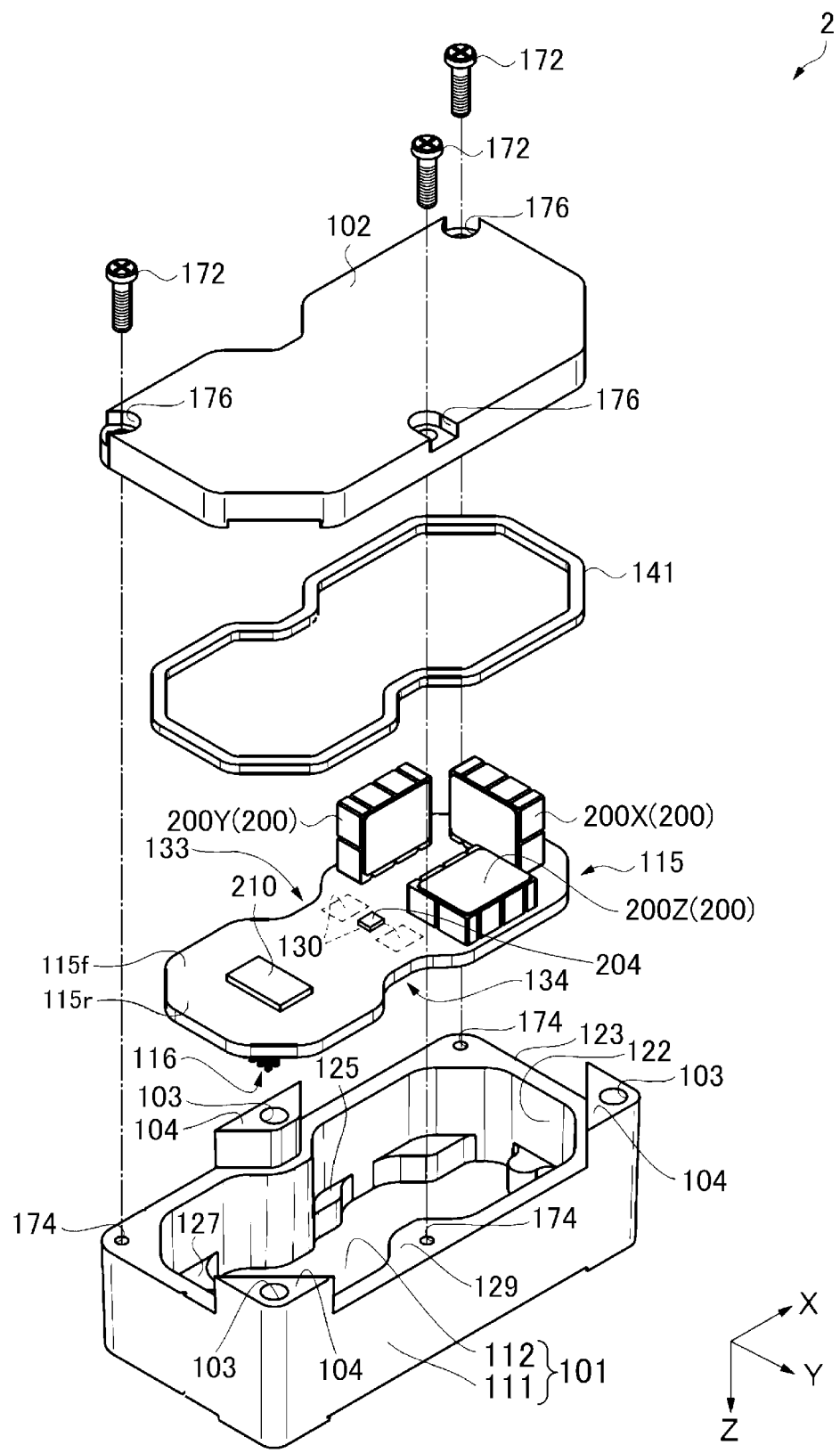
FIG. 2 is an exploded perspective view of the sensor module.

FIG. 2 is an exploded perspective view of the sensor module 2. As illustrated in FIG. 2, the sensor module 2 includes a container 101, a lid 102, a sealing member 141, a circuit substrate 115, and the like. More specifically, in the sensor module 2, the circuit substrate 115 is attached to the inside of the container 101 with a fixing member 130 interposed, and an opening of the container 101 is covered with the lid 102 via the sealing member 141 having buffering properties.

For example, the container 101 is an accommodation container for the circuit substrate 115 made of aluminum and formed into a box shape having an internal space. Similar to an overall shape of the sensor module 2 described above, an outer shape of the container 101 is a rectangular parallelepiped having a substantially rectangular planar shape, and fixed protrusions 104 are provided at two locations near both end portions of one long side and at one location in a central portion of the other long side. The screw hole 103 is formed in each of the fixed protrusions 104.

The container 101 is a box shape whose outer shape is a rectangular parallelepiped and opened on one side. The inside of the container 101 is an internal space surrounded by a bottom wall 112 and a side wall 111. In other words, the container 101 has a box shape in which one surface facing the bottom wall 112 is an opening surface 123. The container 101 is disposed so that an outer edge of the circuit substrate 115 is disposed along an inner surface 122 of the side wall 111, and the lid 102 is fixed thereto so as to cover the opening. On the opening surface 123, the fixed protrusions 104 are erected at two locations near both end portions of one long side of the container 101 and at one location in the central portion of the other long side. An upper surface of the fixed protrusion 104, that is, a surface exposed in the −Z direction protrudes from the upper surface of the container 101.

In addition, the internal space of the container 101 is provided with a protrusion 129 that protrudes from the side wall 111 toward the internal space from the bottom wall 112 to the opening surface 123 at the central portion of one long side facing the fixed protrusion 104 provided in the central portion of the other long side. A female screw 174 is provided on an upper surface of the protrusion 129. The lid 102 is fixed to the container 101 via the sealing member 141 with a screw 172 and the female screw 174 inserted through a through-hole 176. The protrusion 129 and the fixed protrusion 104 are provided at positions facing constricted portions 133 and 134 of the circuit substrate 115 described later.

In the internal space of the container 101, a first pedestal 127 and a second pedestal 125 are provided that protrude from the bottom wall 112 toward the opening surface 123 in a stepped manner. The first pedestal 127 is provided at a position facing a disposition region of the plug-type connector 116 attached to the circuit substrate 115. The first pedestal 127 is provided with the opening portion 121 illustrated in FIG. 1, and a plug-type connector 116 is inserted into the opening portion 121. The first pedestal 127 functions as a pedestal for fixing the circuit substrate 115 to the container 101.

The second pedestal 125 is located on a side opposite to the first pedestal 127 with respect to the fixed protrusion 104 and the protrusion 129 located in the central portion of the long side, and is provided in the vicinity of the fixed protrusion 104 and the protrusion 129. The second pedestal 125 functions as a pedestal for fixing the circuit substrate 115 to the container 101 on the side opposite to the first pedestal 127 with respect to the fixed protrusion 104 and the protrusion 129.

The outer shape of the container 101 is described as the rectangular parallelepiped having the substantially rectangular planar shape with no lid, and is not limited thereto. The planar shape of the outer shape of the container 101 may be a square, a hexagon, an octagon, or the like. In addition, in the planar shape of the outer shape of the container 101, the corners of the polygonal apex portion may be chamfered, and furthermore, any one of the sides may be a planar shape made of a curve. In addition, the planar shape inside the container 101 is not limited to the shape described above, and may be another shape. Furthermore, the planar shape of the outer shape and the inside of the container 101 may be similar or may not be similar to each other.

The circuit substrate 115 is a multilayer substrate in which a plurality of through-holes and the like are formed. For example, a glass epoxy substrate, a composite substrate, a ceramic substrate, or the like is used.

The circuit substrate 115 includes a second surface 115$r$ on the bottom wall 112, and a first surface 115$f$ that has a front-rear relationship with the second surface 115$r$. On the first surface 115$f$ of the circuit substrate 115, a microcontroller 210, a temperature sensor 204, three physical quantity sensors 200, and other electronic components (not illustrated) are mounted. In addition, the connector 116 is mounted on the second surface 115$r$ of the circuit substrate 115. Although illustration and description thereof are omitted, the circuit substrate 115 may be provided with other wirings, terminal electrodes, and the like.

The circuit substrate 115 is provided with the constricted portions 133 and 134 in which the outer edge of the circuit substrate 115 is constricted in the central portion in the X axis direction along the long side of the container 101 in a plan view. The constricted portions 133 and 134 are provided on both sides in the Y axis direction of the circuit substrate 115 in a plan view, and are constricted from the outer edge of the circuit substrate 115 toward the center. In addition, the constricted portions 133 and 134 are provided to face the protrusion 129 and the fixed protrusion 104 of the container 101.

The circuit substrate 115 is inserted into the internal space of the container 101 with the second surface 115$r$ facing the first pedestal 127 and the second pedestal 125. The circuit substrate 115 is supported by the container 101 by the first pedestal 127 and the second pedestal 125.

Of the three physical quantity sensors 200, a physical quantity sensor 200X detects a physical quantity in the X axis direction, a physical quantity sensor 200Y detects a physical quantity in the Y axis direction, and a physical quantity sensor 200Z detects a physical quantity in the Z axis direction. Specifically, the physical quantity sensor 200X is erected so that the front and rear surfaces of a package face in the X axis direction and the side surface faces the first surface 115$f$ of the circuit substrate 115. The physical quantity sensor 200X outputs a signal corresponding to the detected physical quantity in the X axis direction. The physical quantity sensor 200Y is erected so that the front and rear surfaces of a package face the Y axis direction and the side surface faces the first surface 115$f$ of the circuit substrate 115. The physical quantity sensor 200Y outputs a signal corresponding to the detected physical quantity in the Y axis direction. The physical quantity sensor 200Z is provided so that the front and rear surfaces of a package face the Z axis direction, that is, the front and rear surfaces of the package face the first surface 115$f$ of the circuit substrate 115. The physical quantity sensor 200Z outputs a signal corresponding to the detected physical quantity in the Z axis direction.

The microcontroller 210 is electrically coupled to the temperature sensor 204 and the physical quantity sensors 200X, 200Y, and 200Z through wirings and electronic components (not illustrated). In addition, the microcontroller 210 controls each portion of the sensor module 2 and generates physical quantity data based on the output signals of the physical quantity sensors 200X, 200Y, and 200Z.

1-2. Structure of Physical Quantity Sensor

Next, an example of a structure of the physical quantity sensor 200 will be described by taking the case where the physical quantity sensor 200 is an acceleration sensor as an example. The three physical quantity sensors 200 illustrated in FIG. 2, that is, the physical quantity sensors 200X, 200Y, and 200Z may have the same structure to one another.

Figure 3:
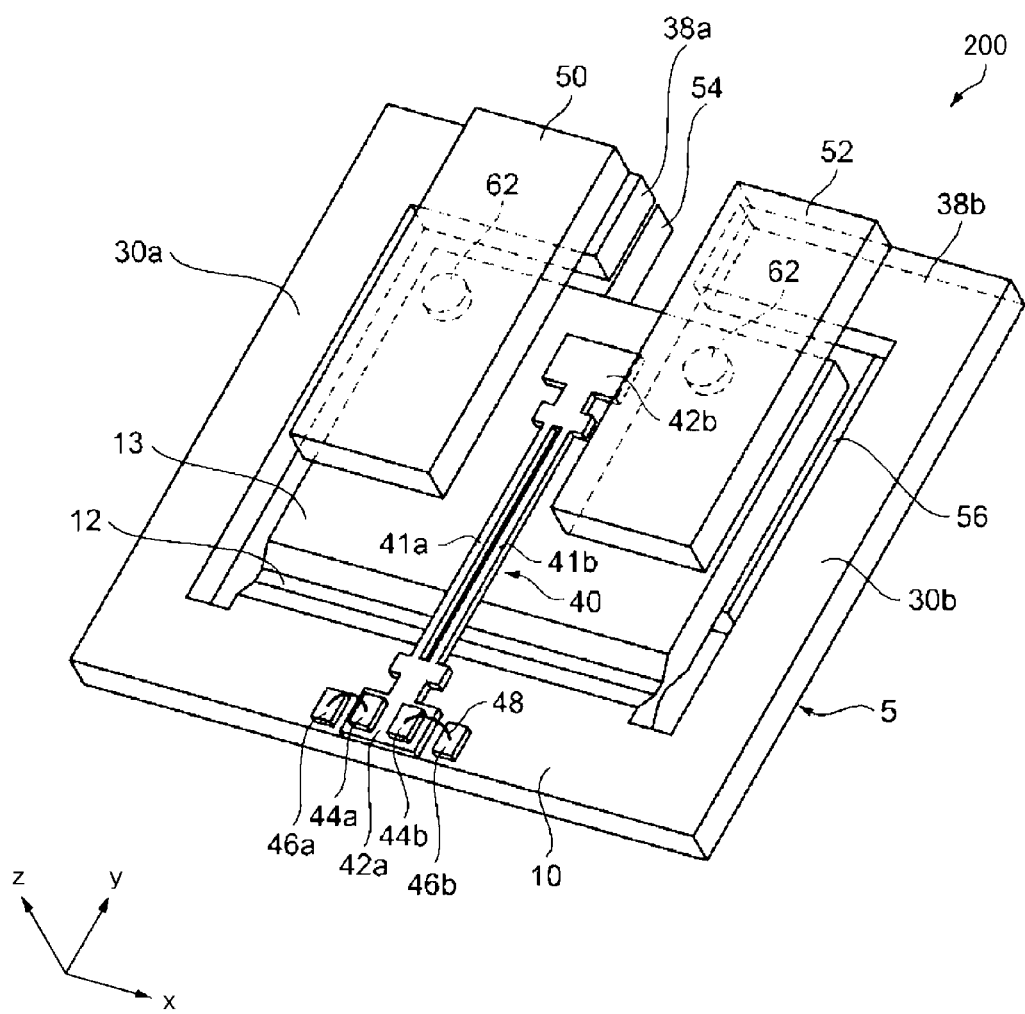
FIG. 3 is a perspective view of a physical quantity sensor.
Figure 4:
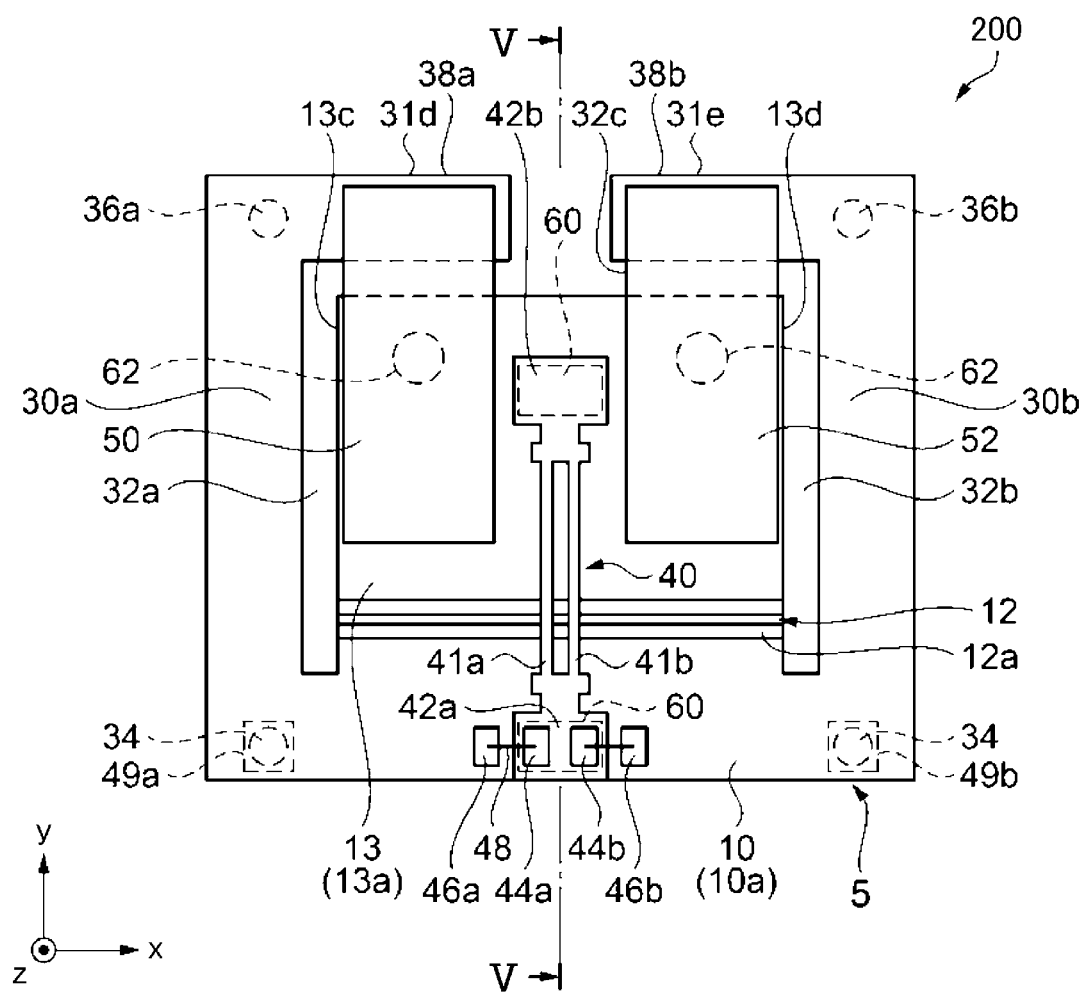
FIG. 4 is a plan view of the physical quantity sensor.
Figure 5:
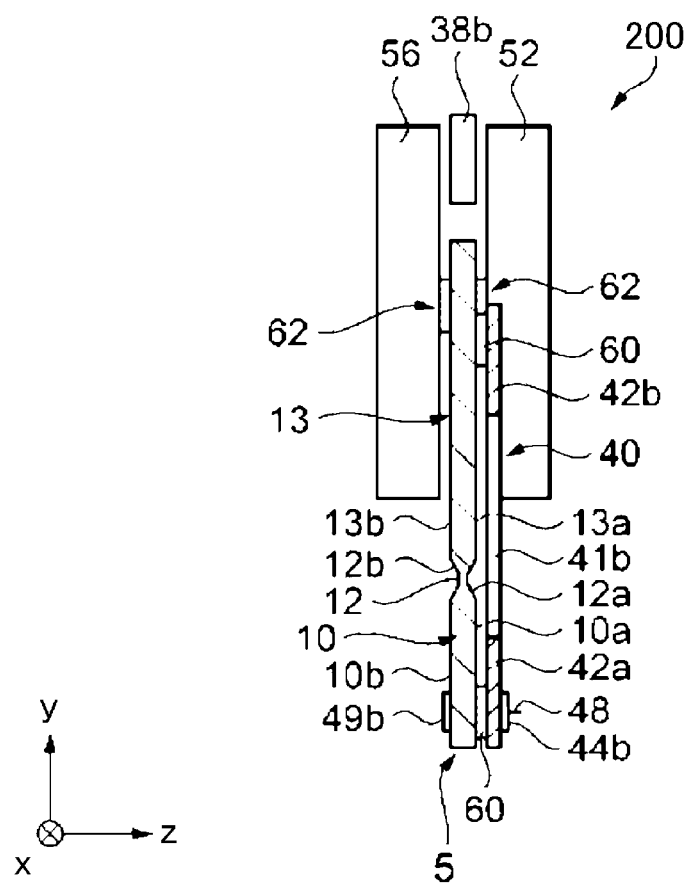
FIG. 5 is a cross-sectional view taken along line V-V in FIG. 4.

FIG. 3 is a perspective view of the physical quantity sensor 200, FIG. 4 is a plan view of the physical quantity sensor 200, and FIG. 5 is a cross-sectional view taken along line V-V of FIG. 4. FIGS. 3 to 5 illustrate only the inside of the package of the physical quantity sensor 200. In the subsequent drawings, for convenience of description, the x axis, the y axis, and the z axis are illustrated as three axes orthogonal to each other. In addition, in the following description, for convenience of description, a plan view when viewed from the z axis direction as a thickness direction of extension portions 38$a$ and 38$b$ is simply referred to as "plan view".

As illustrated in FIGS. 3 to 5, the physical quantity sensor 200 includes a substrate portion 5 and four weights 50, 52, 54, and 56.

The substrate portion 5 is provided with a plate-like base portion 10 having principal surfaces 10$a$ and 10$b$ extending in the x axis direction and facing opposite to each other, a joining portion 12 extending from the base portion 10 in the y axis direction, a movable portion 13 extending in a rectangular shape from the joining portion 12 in a direction opposite to the base portion 10, two support portions 30$a$ and 30$b$ extending along an outer edge of the movable portion 13 from both ends of the base portion 10 in the x axis direction, and a physical quantity detection element 40 spanned from the base portion 10 to the movable portion 13 and joined to the base portion 10 and the movable portion 13.

In the two support portions 30a and 30b, the support portion 30a is provided with a bonding portion 36a extending along the y axis with the movable portion 13 and a gap 32a therebetween and fixing the support portion 30a, and the extension portion 38a extending along the x axis with the movable portion 13 and a gap 32c therebetween. In other words, the support portion 30a is provided with the extension portion 38a extending along the y axis with the movable portion 13 and the gap 32a therebetween and extending along the x axis with the movable portion 13 and the gap 32c therebetween, and the bonding portion 36a is provided from the support portion 30a to the extension portion 38a. In addition, the support portion 30b is provided with a bonding portion 36b extending along the y axis with the movable portion 13 and a gap 32b therebetween and fixing the support portion 30b, and the extension portion 38b extending along the x axis with the movable portion 13 and the gap 32c therebetween. In other words, the support portion 30b is provided with the extension portion 38b extending along the y axis with the movable portion 13 and the gap 32b therebetween and extending along the x axis with the movable portion 13 and the gap 32c therebetween, and the bonding portion 36b is provided from the support portion 30b to the extension portion 38b.

The bonding portions 36a and 36b provided on the support portions 30a and 30b are for mounting the substrate portion 5 of the physical quantity sensor 200 on an external member such as a package. In addition, the base portion 10, the joining portion 12, the movable portion 13, the support portions 30a and 30b, and the extension portions 38a and 38b may be formed integrally.

The movable portion 13 is surrounded by the support portions 30a and 30b and the base portion 10, and is coupled to the base portion 10 via the joining portion 12 and is cantilevered. The movable portion 13 includes the principal surfaces 13a and 13b facing opposite to each other, a side surface 13c along the support portion 30a, and a side surface 13d along the support portion 30b. The principal surface 13a is a surface facing the same side as the principal surface 10a of the base portion 10, and the principal surface 13b is a surface facing the same side as the principal surface 10b of the base portion 10.

The joining portion 12 is provided between the base portion 10 and the movable portion 13 and couples the base portion 10 to the movable portion 13. The joining portion 12 is formed to be thinner than the base portion 10 and the movable portion 13. The joining portion 12 has grooves 12a and 12b. The grooves 12a and 12b are formed along the X axis. In the joining portion 12, when the movable portion 13 is displaced with respect to the base portion 10, the grooves 12a and 12b function as fulcrums, that is, intermediate hinges. Such a joining portion 12 and the movable portion 13 function as cantilever.

In addition, the physical quantity detection element 40 is fixed to a surface from the principal surface 10a of the base portion 10 to the principal surface 13a of the movable portion 13 by a bonding agent 60. The fixed positions of the physical quantity detection element 40 are two positions of the central positions in the x axis direction of the principal surface 10a and the principal surface 13a.

The physical quantity detection element 40 includes a base portion 42a fixed to the principal surface 10a of the base portion 10 with a bonding agent 60, a base portion 42b fixed to the principal surface 13a of the movable portion 13 with a bonding agent 60, and vibration beams 41a and 41b for detecting a physical quantity between the base portion 42a and the base portion 42b. In this case, the shapes of the vibration beams 41a and 41b are prismatic shapes, and when an AC voltage drive signal is applied to excitation electrodes (not illustrated) provided on the vibration beams 41a and 41b, flexural vibration is caused to be separated from or close to each other along the x axis. That is, the physical quantity detection element 40 is a tuning fork type vibrator element.

On the base portion 42a of the physical quantity detection element 40, lead electrodes 44a and 44b are provided. These lead electrodes 44a and 44b are electrically coupled to excitation electrodes (not illustrated) provided on the vibration beams 41a and 41b. The lead electrodes 44a and 44b are electrically coupled to connection terminals 46a and 46b provided on the principal surface 10a of the base portion 10 by metal wires 48. The connection terminals 46a and 46b are electrically coupled to external connection terminals 49a and 49b by wiring (not illustrated). The external connection terminals 49a and 49b are provided on the principal surface 10b of the base portion 10 that is a surface on which the physical quantity sensor 200 is mounted on a package or the like so as to overlap a package bonding portion 34 in a plan view. The package bonding portion 34 is for mounting the substrate portion 5 of the physical quantity sensor 200 on an external member such as a package, and is provided at two locations on end portions at both ends of the base portion 10 in the x axis direction.

The physical quantity detection element 40 is formed by patterning a quartz crystal substrate cut out at a predetermined angle from a quartz crystal ore or the like by a photolithography technique and an etching technique. In this case, the physical quantity detection element 40 is preferably made of the same material as the base portion 10 and the movable portion 13 in consideration of reducing a difference between the linear expansion coefficient between the base portion 10 and the movable portion 13.

The weights 50, 52, 54, and 56 are rectangular in a plan view, and are provided on the movable portion 13. The weights 50 and 52 are fixed to the principal surface 13a of the movable portion 13 by a bonding member 62, and the weights 54 and 56 are fixed to the principal surface 13b of the movable portion 13 by the bonding member 62. Here, in the weight 50 fixed to the principal surface 13a, the directions of one side as a rectangular edge side and the side surface 13c of the movable portion 13 are aligned, and the directions of the other side and the side surface 31d of the extension portion 38a are aligned in a plan view. The weight 50 is disposed on the side surface 13c of the movable portion 13 by aligning the directions in this manner, and the weight 50 and the extension portion 38a are disposed so as to overlap each other in a plan view. Similarly, in the weight 52 fixed to the principal surface 13a, the directions of one side as a rectangular edge side and the side surface 13d of the movable portion 13 are aligned, and the directions of the other side and the side surface 31e of the extension portion 38b are aligned in a plan view. As a result, the weight 52 is disposed on the side surface 13d of the movable portion 13, and the weight 52 and the extension portion 38b are disposed so as to overlap each other in a plan view. In the weight 54 fixed to the principal surface 13b, the directions of one side of a rectangle and the side surface 13c of the movable portion 13 are aligned, and the directions of the other side and the side surface 31d of the extension portion 38a are aligned in a plan view. As a result, the weight 54 is disposed on the side surface 13c of the movable portion 13, and the weight 54 and the extension portion 38a are disposed so as to overlap each other in a plan view. Similarly, in the weight 56 fixed to the principal surface 13b, the directions of one side of a rectangle and the side surface 13d of the movable portion 13 are aligned, and the directions of the other side and the side surface 31e of the extension portion 38b are aligned in a plan view. As a result, the weight 56 is disposed on the side surface 13d of the movable portion 13, and the weight 56 and the extension portion 38b are disposed so as to overlap each other in a plan view.

The weights 50, 52, 54, 56 disposed in this manner are disposed symmetrically with respect to the physical quantity detection element 40, and the weights 54 and 56 are disposed so as to overlap the weights 50 and 52, respectively, in a plan view. These weights 50, 52, 54, and 56 are fixed to the movable portion 13 by bonding members 62 provided at the positions of the center of gravity of the weights 50, 52, 54, and 56, respectively. In addition, the weights 50 and 54 and the extension portion 38a and the weights 52 and 56 and the extension portion 38b overlap each other respectively, in a plan view. Therefore, when an excessive physical quantity is applied, the weights 50, 52, 54, and 56 abut on the extension portions 38a and 38b, and the displacement amounts of the weights 50, 52, 54, and 56 can be suppressed.

The bonding member 62 is made of a silicone resin thermosetting adhesive or the like. The bonding member 62 is applied to the principal surface 13a and the principal surface 13b of the movable portion 13 at two locations, respectively, and the weights 50, 52, 54, and 56 are placed thereon. Thereafter, the weights 50, 52, 54, 56 are fixed to the movable portion 13 by being cured by heating. Bonding surfaces of the weights 50, 52, 54, and 56 facing the principal surface 13a and the principal surface 13b of the movable portion 13 are rough surfaces. As a result, when the weights 50, 52, 54, and 56 are fixed to the movable portion 13, a bonding area on the bonding surface is increased, and the bonding strength can be improved.

Figure 6:
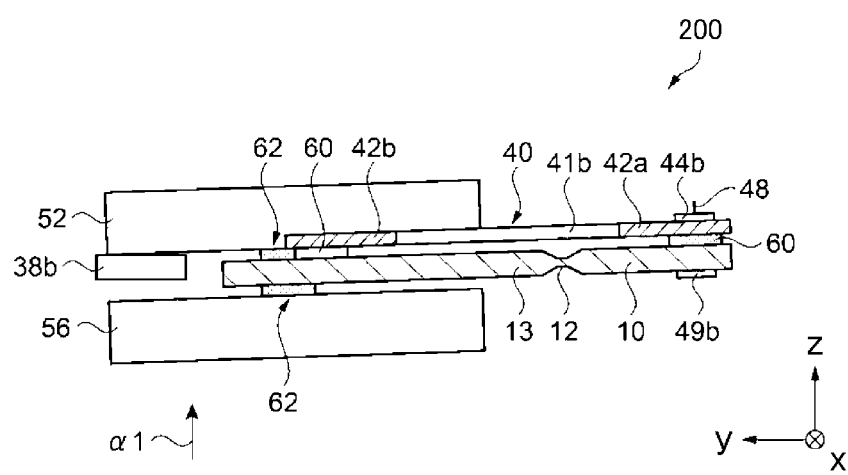
FIG. 6 is an explanatory diagram of an operation of the physical quantity sensor.

As illustrated in FIG. 6, when the acceleration in the +Z direction represented by the arrow α1 is applied to the physical quantity sensor 200 configured as described above, a force acts on the movable portion 13 in the −Z direction, and the movable portion 13 is displaced in the −Z direction with the joining portion 12 as a fulcrum. As a result, a force in a direction where the base portion 42a and the base portion 42b are separated from each other along the Y axis is applied to the physical quantity detection element 40, and tensile stress is generated in the vibration beams 41a and 41b. Therefore, the frequency at which the vibration beams 41a and 41b vibrate increases.

Figure 7:
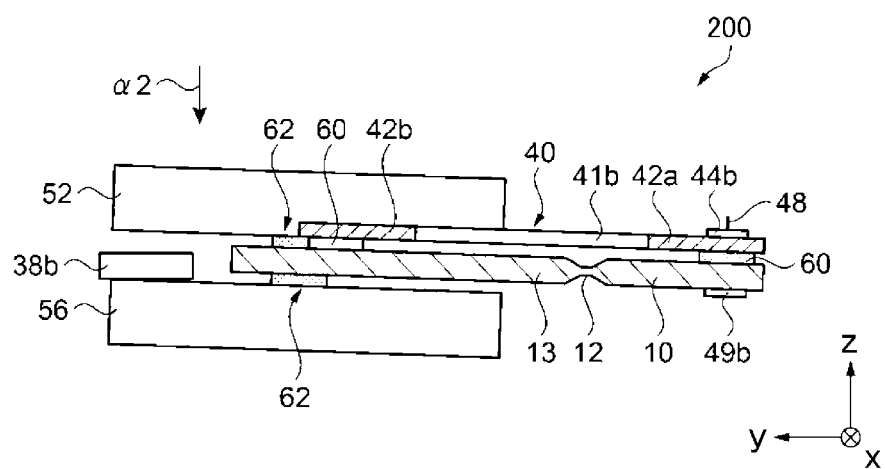
FIG. 7 is an explanatory diagram of an operation of the physical quantity sensor.

On the other hand, as illustrated in FIG. 7, when acceleration in the −Z direction represented by the arrow α2 is applied to the physical quantity sensor 200, a force acts on the movable portion 13 in the +Z direction, and the movable portion 13 is displaced in the +Z direction with the joining portion 12 as a fulcrum. As a result, a force in a direction where the base portion 42a and the base portion 42b approach each other along the Y axis is applied to the physical quantity detection element 40, and compressive stress is generated in the vibration beams 41a and 41b. Therefore, the frequency at which the vibration beams 41a and 41b vibrate decreases.

When the frequency at which the vibration beams 41a and 41b vibrate changes according to the acceleration, the frequency of signals output from the external connection terminals 49a and 49b of the physical quantity sensor 200 changes. The sensor module 2 can calculate the value of the acceleration applied to the physical quantity sensor 200 based on the change in the frequency of the output signal of the physical quantity sensor 200.

In order to increase the detection accuracy of acceleration which is a physical quantity, the joining portion 12 that connects the base portion 10 as a fixed portion and the movable portion 13 is preferably a quartz crystal that is a member having a high Q value. For example, the base portion 10, the support portions 30a and 30b, and the movable portion 13 may be formed of a quartz crystal plate, and the grooves 12a and 12b of the joining portion 12 may be formed by half etching from both sides of the quartz crystal plate.

1-3. Configuration of Sensor Module

Figure 8:
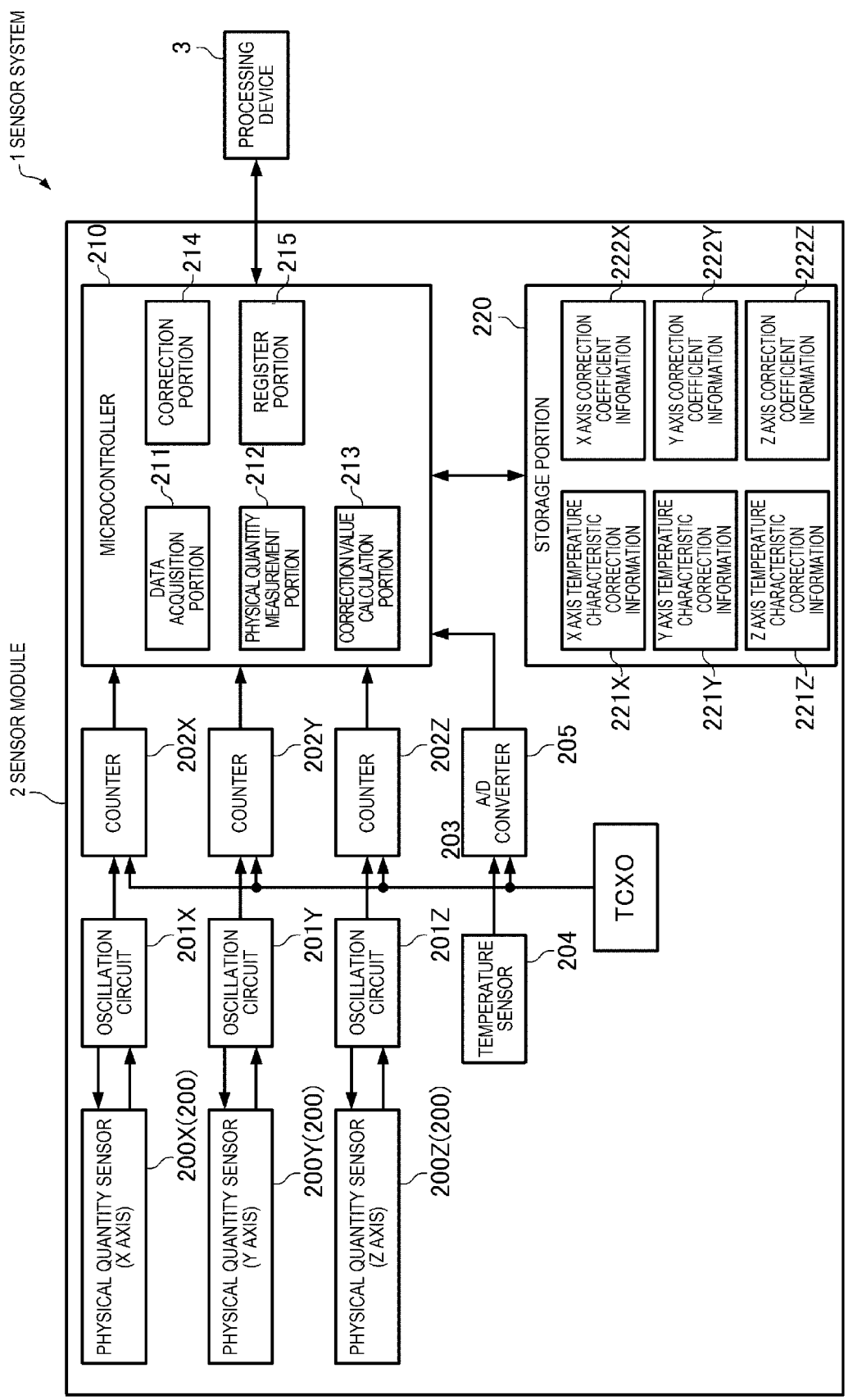
FIG. 8 is a diagram illustrating a configuration example of the sensor module.

Next, an example of a configuration of the sensor module 2 according to the present embodiment will be described. FIG. 8 is a diagram illustrating a configuration example of the sensor module 2 according to the present embodiment. As illustrated in FIG. 8, a processing device 3 is a device that performs processing based on the output signal of the sensor module 2 described above, and a sensor system 1 including the sensor module 2 and the processing device 3 is constructed. In FIG. 8, although there is one sensor module 2, the sensor system 1 may include a plurality of sensor modules 2, and the processing device 3 may perform processing based on the output signals of the plurality of sensor modules 2. At least a portion of the plurality of sensor modules 2 may be installed in the same structure, or may be installed in different structures.

The sensor module 2 includes the physical quantity sensors 200X, 200Y, and 200Z described above, oscillation circuits 201X, 201Y, and 201Z, counters 202X, 202Y and 202Z, a temperature compensated crystal oscillator (TCXO) 203, the temperature sensor 204 described above, an analog and digital converter 205, the microcontroller 210 described above, and the storage portion 220 described above.

The oscillation circuit 201X amplifies the output signal of the physical quantity sensor 200X to generate a drive signal, and applies the drive signal to the physical quantity sensor 200X. Due to the drive signal, the vibration beams 41a and 41b of the physical quantity sensor 200X vibrate at a frequency corresponding to the acceleration in the X axis direction, and a signal of the frequency is output from the physical quantity sensor 200X. In addition, the oscillation circuit 201X outputs a rectangular wave signal obtained by amplifying the output signal of the physical quantity sensor 200X to the counter 202X.

Similarly, the oscillation circuit 201Y amplifies the output signal of the physical quantity sensor 200Y to generate a drive signal, and applies the drive signal to the physical quantity sensor 200Y. Due to the drive signal, the vibration beams 41a and 41b of the physical quantity sensor 200Y vibrate at a frequency corresponding to the acceleration in the Y axis direction, and a signal of the frequency is output from the physical quantity sensor 200Y. In addition, the oscillation circuit 201Y outputs a rectangular wave signal obtained by amplifying the output signal of the physical quantity sensor 200Y to the counter 202Y.

Similarly, the oscillation circuit 201Z amplifies the output signal of the physical quantity sensor 200Z to generate a drive signal, and applies the drive signal to the physical quantity sensor 200Z. Due to the drive signal, the vibration beams 41a and 41b of the physical quantity sensor 200Z vibrate at a frequency corresponding to the acceleration in the Z axis direction, and a signal of the frequency is output from the physical quantity sensor 200Z. In addition, the oscillation circuit 201Z outputs a rectangular wave signal obtained by amplifying the output signal of the physical quantity sensor 200Z to the counter 202Z.

The counters 202X, 202Y, and 202Z operate using the oscillation signal output from the temperature compensated crystal oscillator 203 as a clock signal. The counter 202X counts a predetermined cycle of the rectangular wave signal output from the oscillation circuit 201X with a clock signal every predetermined cycle, and outputs X axis count data having a value of the counted result. Similarly, the counter 202Y counts a predetermined cycle of the rectangular wave signal output from the oscillation circuit 201Y with a clock signal, and outputs Y axis count data having a value of the counted result. Similarly, the counter 202Z counts a predetermined cycle of the rectangular wave signal output from the oscillation circuit 201Z with a clock signal, and outputs Z axis count data having a value of the counted result.

A storage portion 220 stores programs and data, and may include a volatile memory such as a static random access memory (SRAM) or a dynamic random access memory (DRAM). In addition, the storage portion 220 may include a non-volatile memory such as a semiconductor memory such as an electrically erasable programmable read only memory (EEPROM) or a flash memory, a magnetic storage device such as a hard disk device, or an optical storage device such as an optical disk device.

In the present embodiment, the storage portion 220 stores X axis temperature characteristic correction information 221X for correcting the frequency-temperature characteristic of the output signal of the physical quantity sensor 200X. In addition, the storage portion 220 also stores Y axis temperature characteristic correction information 221Y for correcting the frequency-temperature characteristic of the output signal of the physical quantity sensor 200Y. In addition, the storage portion 220 stores Z axis temperature characteristic correction information 221Z for correcting the frequency-temperature characteristic of the output signal of the physical quantity sensor 200Z. For example, the X axis temperature characteristic correction information 221X, the Y axis temperature characteristic correction information 221Y, and the Z axis temperature characteristic correction information 221Z may be information on coefficient values of the terms of the approximate expression that approximates the frequency-temperature characteristics of each of the output signals of the physical quantity sensors 200X, 200Y, and 200Z, and may be table information that defines the correspondence relationship between the temperature and the correction value based on the approximate expression.

In addition, in the present embodiment, the storage portion 220 stores X axis correction coefficient information 222X for correcting the frequency error in the output signal of the physical quantity sensor 200X that may occur when the temperature changes sharply. In addition, the storage portion 220 also stores Y axis correction coefficient information 222Y for correcting a frequency error in the output signal of the physical quantity sensor 200Y that may occur when the temperature changes sharply. In addition, the storage portion 220 also stores Z axis correction coefficient information 222Z for correcting a frequency error in the output signal of the physical quantity sensor 200Z that may occur when the temperature changes sharply.

For example, the X axis temperature characteristic correction information 221X, the Y axis temperature characteristic correction information 221Y, the Z axis temperature characteristic correction information 221Z, the X axis correction coefficient information 222X, the Y axis correction coefficient information 222Y, and the Z axis correction coefficient information 222Z are calculated when the sensor module 2 is manufactured or installed, and are stored in a non-volatile memory (not illustrated) included in the storage portion 220.

As illustrated in FIG. 2, the temperature sensor 204 is mounted on the first surface 115f of the circuit substrate 115, detects the temperature around the physical quantity sensors 200X, 200Y, and 200Z, and outputs a signal having a voltage level corresponding to the detected temperature.

The analog and digital converter 205 converts the signal output from the temperature sensor 204 into temperature data, which is a digital signal, and outputs the temperature data. The temperature sensor 204 may be a temperature sensor that outputs a digital signal. In this case, the analog and digital converter 205 is unnecessary.

The microcontroller 210 performs various control processing and various arithmetic processing based on count data output from the counters 202X, 202Y, and 202Z and temperature data output from the analog and digital converter 205.

In the present embodiment, the microcontroller 210 includes a data acquisition portion 211, a physical quantity measurement portion 212, a correction value calculation portion 213, a correction portion 214, and a register portion 215. For example, the microcontroller 210 may function as each of the above portions by executing a program (not illustrated) stored in the storage portion 220.

The data acquisition portion 211 acquires X axis count data, Y axis count data values, and Z axis count data, which are physical quantity data based on the output signals from the physical quantity sensors 200X, 200Y, and 200Z, from the counters 202X, 202Y, and 202Z, respectively. In addition, temperature data based on the output signal from the temperature sensor is acquired from the analog and digital converter 205.

The physical quantity measurement portion 212 measures the physical quantities detected by each of the physical quantity sensors 200X, 200Y, and 200Z based on the X axis count data, the Y axis count data, and the Z axis count data that are physical quantity data acquired by the data acquisition portion 211. Specifically, the physical quantity measurement portion 212 converts the X axis count data value, the Y axis count data value, and the Z axis count data value into a measurement value of the physical quantity in the X axis direction, a measurement value of the physical quantity in the Y axis direction, a measurement value of the physical quantity in the Z axis direction, respectively. For example, the storage portion 220 stores table information that defines the correspondence relationship between the count data value and the measurement value of the physical quantity, or information on the relational expression between the count data value and the measurement value of the physical quantity, and the physical quantity measurement portion 212 may convert each count data into a measurement value of a physical quantity with reference to the information. The physical quantity measurement portion 212 may perform filtering processing to reduce noise outside the frequency bandwidth of the physical quantity, or thinning processing for reducing the data rate according to the frequency bandwidth of the physical quantity on the count data before the conversion to the measurement value of the physical quantity.

The correction value calculation portion 213 calculates a first X axis correction value for correcting the frequency-temperature characteristic of the output signal of the physical quantity sensor 200X, based on the temperature data acquired by the data acquisition portion 211 and the X axis temperature characteristic correction information 221X. In addition, the correction value calculation portion 213 calculates a first Y axis correction value for correcting the frequency-temperature characteristic of the output signal of the physical quantity sensor 200Y based on the temperature data and the Y axis temperature characteristic correction information 221Y. In addition, the correction value calculation portion 213 calculates a first Z axis correction value for correcting the frequency-temperature characteristic of the output signal of the physical quantity sensor 200Z based on the temperature data and the Z axis temperature characteristic correction information 221Z. The correction value calculation portion 213 periodically calculates the first X axis correction value, the first Y axis correction value, and the first Z axis correction value.

For example, when the X axis temperature characteristic correction information 221X, the Y axis temperature characteristic correction information 221Y, and the Z axis temperature characteristic correction information 221Z are information on coefficient values of the terms of the approximate expression that approximates the frequency-temperature characteristics of each of the output signals of the physical quantity sensors 200X, 200Y, and 200Z, the first X axis correction value, the first Y axis correction value, and the first Z axis correction value may be values obtained by inverting the sign of a value obtained by substituting the value of temperature data into each approximate expression. In addition, for example, when the X axis temperature characteristic correction information 221X, the Y axis temperature characteristic correction information 221Y, and the Z axis temperature characteristic correction information 221Z are table information that defines a correspondence relationship between a temperature and a correction value based on the approximate expression that approximates the frequency-temperature characteristic of each of the output signal of the physical quantity sensors 200X, 200Y, and 200Z, the first X axis correction value, the first Y axis correction value, and the first Z axis correction value may be correction values corresponding to values of temperature data in each table information.

In addition, the correction value calculation portion 213 calculates a second X axis correction value for correcting the frequency error of the output signal of the physical quantity sensor 200X that may occur when the temperature changes sharply, based on the temperature data acquired by the data acquisition portion 211 and the X axis correction coefficient information 222X. In addition, the correction value calculation portion 213 calculates a second Y axis correction value for correcting the frequency error of the output signal of the physical quantity sensor 200Y that may occur when the temperature changes sharply, based on the temperature data and the Y axis correction coefficient information 222Y. In addition, the correction value calculation portion 213 calculates a second Z axis correction value for correcting the frequency error of the output signal of the physical quantity sensor 200Z that may occur when the temperature changes sharply, based on the temperature data and the Z axis correction coefficient information 222Z. The correction value calculation portion 213 periodically calculates the second X axis correction value, the second Y axis correction value, and the second Z axis correction value.

The correction portion 214 performs various correction calculations on the measurement value of the physical quantity in the X axis direction, the measurement value of the physical quantity in the Y axis direction, and the measurement value of the physical quantity in the Z axis direction measured by the physical quantity measurement portion 212. For example, the correction portion 214 performs temperature correction for correcting a detection error due to temperature for each detection axis. Specifically, the correction portion 214 corrects the temperature of the measurement value of the physical quantity in the X axis direction based on the first X axis correction value and the second X axis correction value calculated by the correction value calculation portion 213. For example, the correction portion 214 may perform temperature correction on the measurement value of the physical quantity in the X axis direction by adding the first X axis correction value and the second X axis correction value to the measurement value of the physical quantity in the X axis direction. In addition, the correction portion 214 corrects the temperature of the measurement value of the physical quantity in the Y axis direction based on the first Y axis correction value and the second Y axis correction value calculated by the correction value calculation portion 213. For example, the correction portion 214 may perform temperature correction on the measurement value of the physical quantity in the Y axis direction by adding the first Y axis correction value and the second Y axis correction value to the measurement value of the physical quantity in the Y axis direction. In addition, the correction portion 214 corrects the temperature of the measurement value of the physical quantity in the Z axis direction based on the first Z axis correction value and the second Z axis correction value calculated by the correction value calculation portion 213. For example, the correction portion 214 may perform temperature correction on the measurement value of the physical quantity in the Z axis direction by adding the first Z axis correction value and the second Z axis correction value to the measurement value of the physical quantity in the Z axis direction.

In addition, the correction portion 214 may perform sensitivity correction that corrects the detection sensitivity of the physical quantity for each detection axis, alignment correction that corrects a shift in detection sensitivity between the detection axes, linearity correction that corrects the relationship between the physical quantity applied in each detection axis direction and the measurement value of the physical quantity in each detection axis direction to approach a straight line, and the like. The correction portion 214 transmits the corrected measurement value of the physical quantity in the X axis direction, the measurement value of the physical quantity in the Y axis direction, and the measurement value of the physical quantity in the Z axis direction to the processing device 3. Alternatively, the correction portion 214 may write the corrected measurement value of the physical quantity in the X axis direction, the measurement value of the physical quantity in the Y axis direction, and the measurement value of the physical quantity in the Z axis direction to predetermined data registers of the register portion 215, respectively, and the processing device 3 may read the value of the register.

The register portion 215 includes various control registers and various data registers. For example, the register portion 215 may include a data register that stores the measurement value of the physical quantity in the X axis direction, the measurement value of the physical quantity in the Y axis direction, and the measurement value of the physical quantity in the Z axis direction.

As described above, the microcontroller 210 functions as a temperature correction device including a data acquisition portion 211 that acquires the physical quantity data based on the output signals from the physical quantity sensors 200X, 200Y, and 200Z and temperature data based on the output signal from the temperature sensor 204, the physical quantity measurement portion 212 that measures the physical quantities detected by the physical quantity sensors 200X, 200Y, and 200Z based on the physical quantity data, the correction value calculation portion 213 that calculates the second X axis correction value, the second Y axis correction value, and the second Z axis correction value based on the temperature data, and the correction portion 214 that corrects the measurement value of the physical quantity measured by the physical quantity measurement portion 212 based on the second X axis correction value, the second Y axis correction value, and the second Z axis correction value.

1-4. Calculation Method of Second Correction Value

Next, a specific example of a calculation method of the second X axis correction value, the second Y axis correction value, and the second Z axis correction value will be described. Since the calculation method of the second X axis correction value, the second Y axis correction value, and the second Z axis correction value may be the same, hereinafter, the second X axis correction value, the second Y axis correction value, and the second Z axis correction value are referred to as "second correction values", respectively.

The correction value calculation portion 213 calculates a second correction value $\Delta C2(n)$ based on the product of a temperature gradient value $\Delta T_a(n)$ for a first period P1(n) from a first time t(n−p) to a second time t(n) obtained based on the temperature data $T_d$, and a correction coefficient value E(n).

Figure 9:
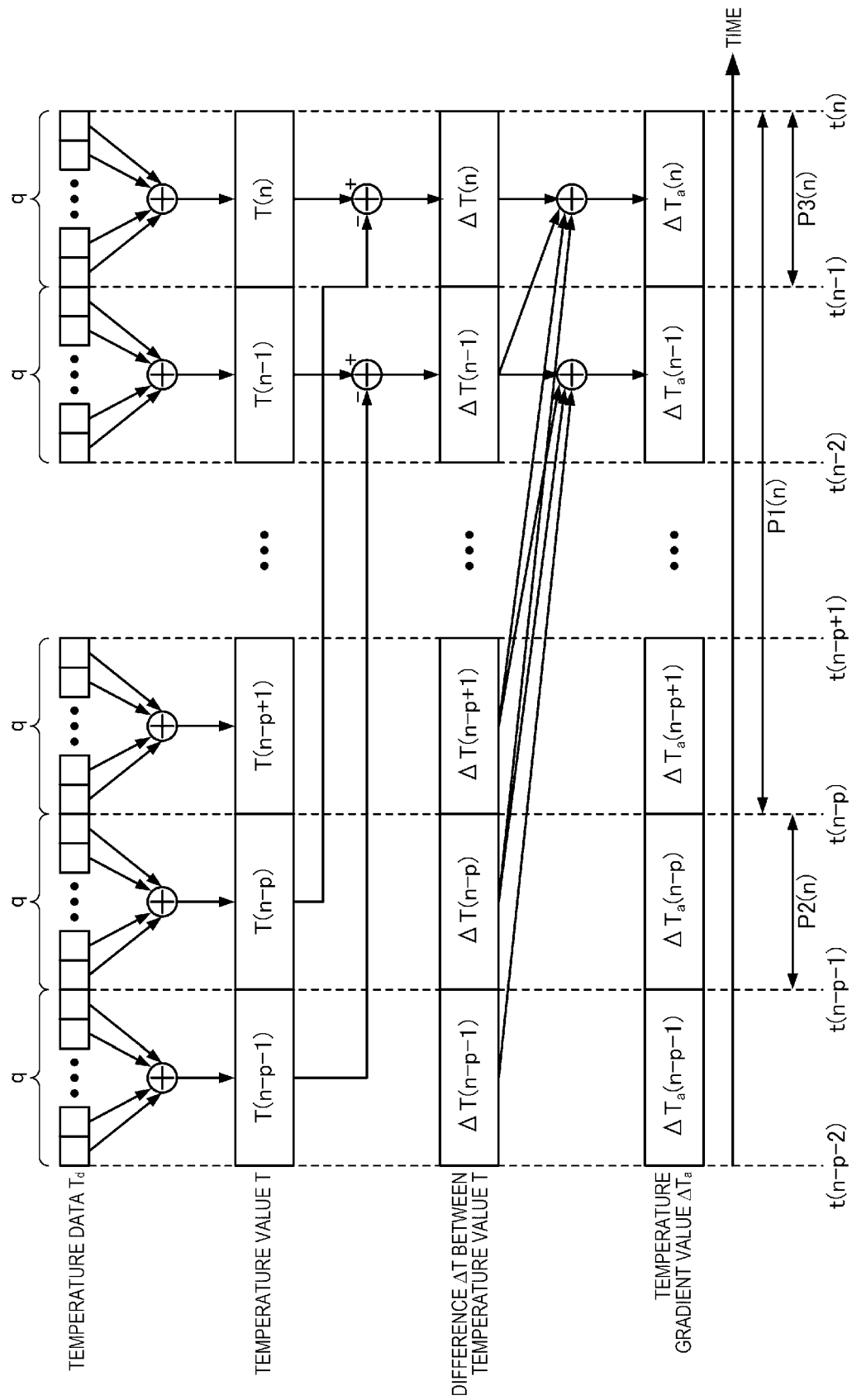
FIG. 9 is a diagram illustrating an example of a method of calculating a temperature gradient value.

FIG. 9 is a diagram illustrating an example of a method of calculating the temperature gradient value $\Delta T_a(n)$. As illustrated in FIG. 9, first, the correction value calculation portion 213 calculates a temperature value T(n−p) at the first time t(n−p) and the temperature value T(n) at the second time t(n), based on a plurality of pieces of the temperature data $T_d$ acquired by the data acquisition portion 211 in the first period P1(n). The temperature value T(n−p) at the first time t(n−p) is a sum of values of q pieces of temperature data $T_d$ acquired by the data acquisition portion 211 in a second period P2(n) from a third time t(n−p−1) to the first time t(n−p). In addition, the temperature value T(n) at the second time is a sum of values of q pieces of temperature data $T_d$ acquired by the data acquisition portion 211 in a third period P3 from a fourth time t(n−1) to the second time t(n).

Specifically, the correction value calculation portion 213 calculates p+1 pieces of temperature values T(n−p) to T(n) for the integer j from n−p to n by the following equation (1), and holds the calculated temperature values in the register portion 215.

$$T(j) = \sum_{i=j-q-1}^{j} T_d(i) \tag{1}$$

Next, the correction value calculation portion 213 calculates a difference $\Delta T(n)$ between the temperature value T(n) at the second time t(n) and the temperature value T(n−p) at the first time t(n−p). Specifically, the correction value calculation portion 213 calculates p+1 pieces of the differences $\Delta T(n-p)$ to $\Delta T(n)$ by the following equation (2), and holds the calculated differences in the register portion 215. In Equation (2), j is an integer from n−p to n.

$$\Delta T(j) = T(j) - T(j-p) \tag{2}$$

Next, the correction value calculation portion 213 calculates a temperature gradient value $\Delta T_a(n)$ for the first period P1(n) based on the difference $\Delta T(n)$. Specifically, the correction value calculation portion 213 calculates the temperature gradient value $\Delta T_a(n)$ for the first period P1(n) by calculating the sum of p+1 pieces of the differences $\Delta T(n-p)$ to $\Delta T(n)$ held in the register portion 215 by the following equation (3).

$$\Delta T_a(n) = \sum_{i=n-p}^{n} \Delta T(i) \tag{3}$$

Figure 10:
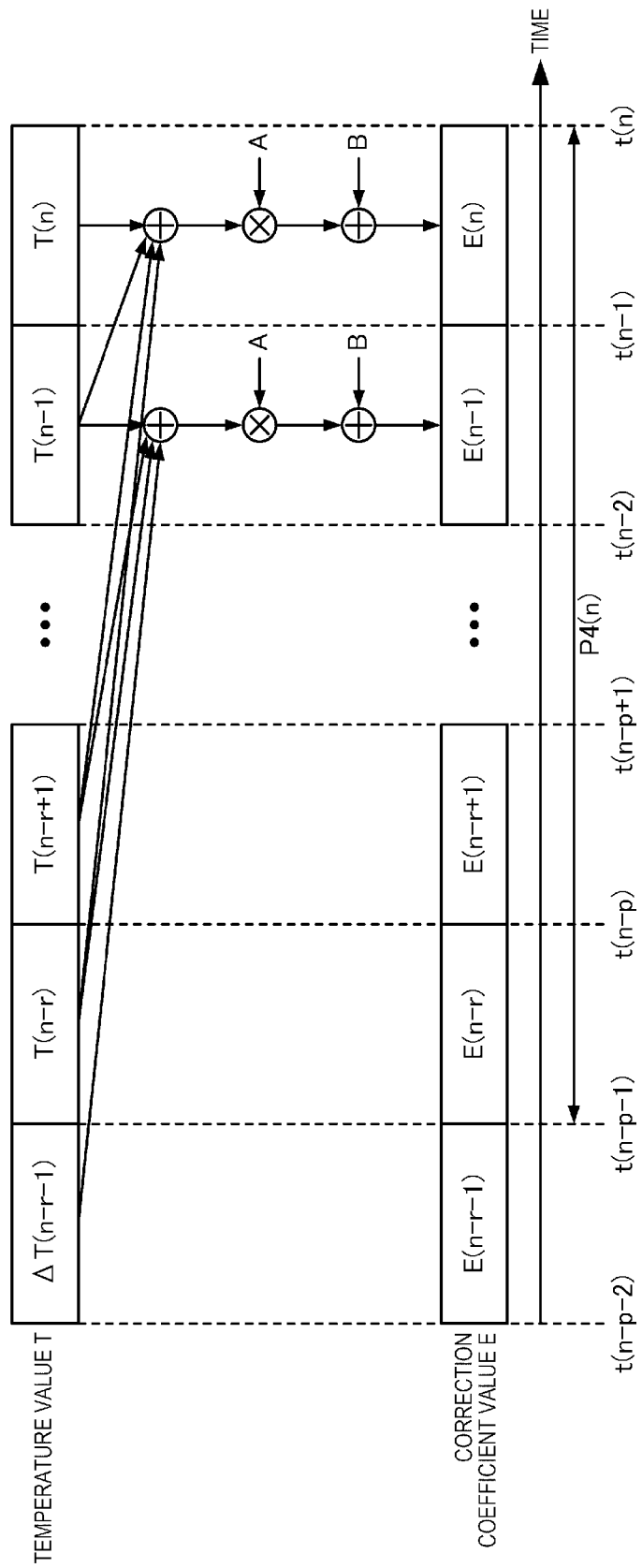
FIG. 10 is a diagram illustrating an example of a method of calculating a correction coefficient value.

In the present embodiment, the correction coefficient value E(n) is a polynomial value having a sum of values of a plurality of pieces of the temperature data Td acquired by the data acquisition portion 211 in a fourth period P4(n) as a variable. FIG. 10 is a diagram illustrating an example of a method of calculating the correction coefficient value E(n). As illustrated in FIG. 10, the correction value calculation portion 213 calculates the correction coefficient value E(n) by calculating the product of the sum of the r+1 pieces of the temperature values T(n−r) to T(n) acquired by the data acquisition portion 211 in the fourth period P4 (n) and held in the register portion 215 and a coefficient value A by the following equation (4), and further adding a constant value B. For example, the coefficient value A and the constant value B are stored in the storage portion 220 as the X axis correction coefficient information 222X, the Y axis correction coefficient information 222Y, or the Z axis correction coefficient information 222Z.

$$E(n) = A \cdot \sum_{i=n-r}^{n} T(n) + B \tag{4}$$

The correction value calculation portion 213 calculates a second correction value $\Delta C2(n)$ by calculating the product of the correction coefficient value E(n) and the temperature gradient value $\Delta T_a(n)$ by the following equation (5).

$$\Delta C2(n) = E(n) \cdot \Delta T_a(n) \tag{5}$$

Equation (4) is a first-order polynomial having a sum of the values of the temperature data $T_d$ as a variable, and the correction coefficient value E(n) may be a second-order or higher-order polynomial value, or may be a zero-order polynomial value, that is, a constant value.

1-5. Temperature Correction Method

Figure 11:
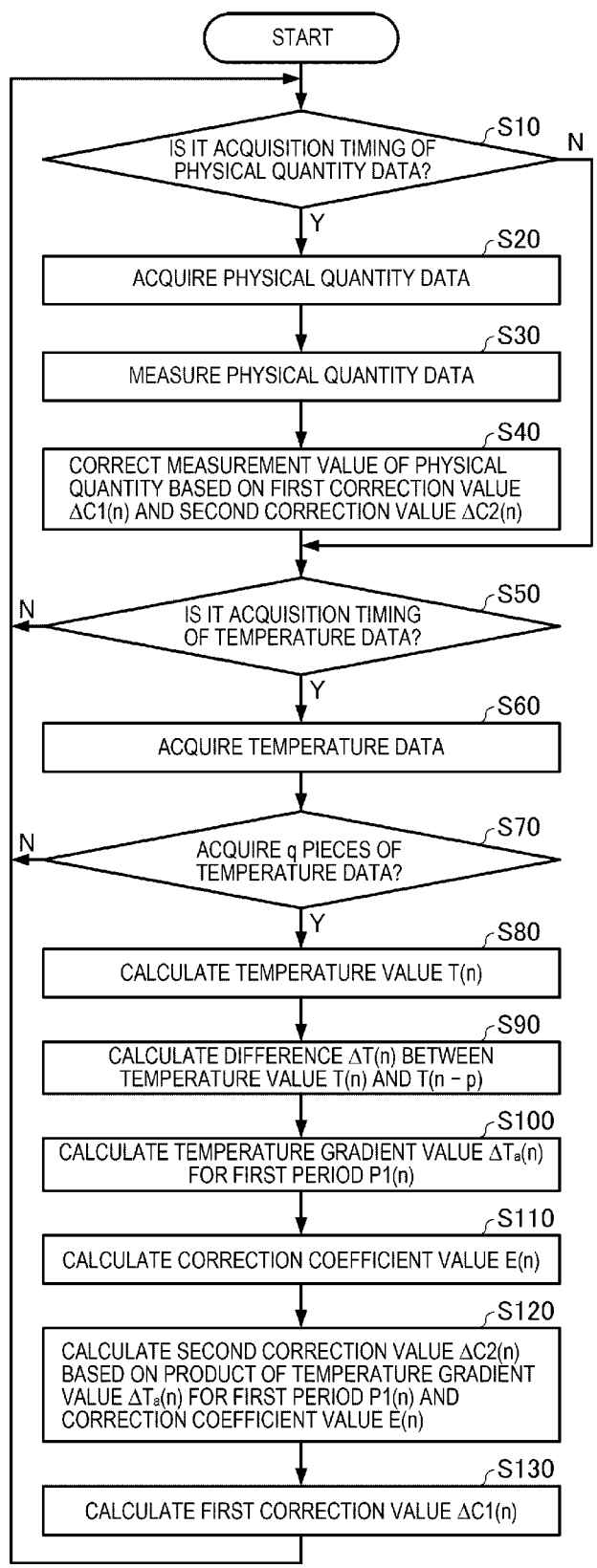
FIG. 11 is a flowchart illustrating an example of a procedure of a temperature correction method.

Next, details of a temperature correction method according to the present embodiment will be described. FIG. 11 is a flowchart illustrating an example of a procedure of the temperature correction method. For example, the microcontroller 210 performs temperature correction processing illustrated in FIG. 11 by executing a program stored in the storage portion 220. The flowchart of FIG. 11 illustrates a temperature correction procedure for the measurement value of the physical quantity of any one of the X axis, the Y axis, and the Z axis.

As illustrated in FIG. 11, first, the microcontroller 210 functions as the data acquisition portion 211 and acquires count data that is physical quantity data when it is an acquisition timing of the physical quantity data (Y in Step S10) (Step S20).

Next, the microcontroller 210 functions as the physical quantity measurement portion 212 and measures the physical quantity based on the count data acquired in Step S20 (Step S30).

Next, the microcontroller 210 functions as the correction portion 214, and corrects the measurement value of the physical quantity measured in Step S30, based on a first correction value $\Delta C1(n)$ calculated in the latest Step S130 and a second correction value $\Delta C2(n)$ calculated in the latest Step S120 (Step S40). For example, the correction portion 214 corrects the measurement value of the physical quantity by adding the first correction value $\Delta C1(n)$ and the second correction value $\Delta C2(n)$ to the measurement value of the physical quantity. When the first correction value $\Delta C1(n)$ and the second correction value $\Delta C2(n)$ are not yet calculated, for example, 0 is set.

When it is not the acquisition timing of the physical quantity data (N in Step S10), the microcontroller 210 does not perform processing of Steps S20 to S40.

Next, the microcontroller 210 functions as the data acquisition portion 211, and acquires temperature data from the analog/digital converter 205 when it is the acquisition timing of the temperature data (Y in Step S50) (Step S60).

Next, the microcontroller 210 functions as the data acquisition portion 211, and when it is the acquisition timing of the temperature data (Y in Step S50), and q pieces of temperature data are newly acquired (Y in Step S70), functions as the correction value calculation portion 213. The microcontroller 210 calculates the temperature value T(n) by Equation (1) using q pieces of temperature data (Step S80). The correction value calculation portion 213 sets the temperature value T(n−p+1) to T(n) held in the register portion 215 as the temperature value T(n−p) to T(n−1), and causes the register portion 215 to hold the newly calculated temperature value T(n). As a result, p+1 pieces of new temperature values T(n−p) to T(n) are held in the register portion 215.

Next, the correction value calculation portion 213 calculates a difference $\Delta T(n)$ between the temperature value T(n) held in the register portion 215 and the temperature value T(n−p) by Equation (2) (Step S90). The correction value calculation portion 213 sets the differences $\Delta T(n-p+1)$ to $\Delta T(n)$ held in the register portion 215 as the differences $\Delta T(n-p)$ to $\Delta T(n-1)$ and causes the register portion 215 to hold the newly calculated difference $\Delta T(n)$. As a result, p+1 pieces of new differences $\Delta T(n-p)$ to $\Delta T(n)$ are held in the register portion 215.

Next, the correction value calculation portion 213 calculates the temperature gradient value $\Delta T_a(n)$ for the first period P1(n) by calculating the sum of p+1 pieces of differences $\Delta T(n-p)$ to $\Delta T(n)$ held in the register portion 215 by Equation (3) (Step S100).

Next, the correction value calculation portion 213 calculates the correction coefficient value E(n) by Equation (4), using the r+1 pieces of temperature values T(n−r) to T(n) held in the register portion 215, the coefficient value A and the constant value B stored as correction coefficient information in the storage portion 220 (Step S110).

Next, the correction value calculation portion 213 calculates the second correction value $\Delta C2(n)$ by Equation (5), based on the product of the temperature gradient value $\Delta T_a(n)$ for the first period P1(n) calculated in Step S100 and the correction coefficient value E(n) calculated in Step S110 (Step S120).

Next, the correction value calculation portion 213 calculates the first correction value $\Delta C1(n)$ using the temperature value T(n) calculated in Step S80 and temperature characteristic correction information stored in the storage portion 220 (Step S130).

When it is not the acquisition timing of temperature data (N of Step S50), the microcontroller 210 does not perform processing of Step S60. In addition, the microcontroller 210 does not perform the processing of Steps S80 to S130 until q pieces of temperature data are newly acquired (N in Step S70).

The microcontroller 210 repeats the processing of Steps S10 to S130.

Step S20 in FIG. 11 is an example of a "physical quantity data acquisition step". In addition, Step S30 in FIG. 11 is an example of a "physical quantity measurement step". In addition, Step S40 in FIG. 11 is an example of a "correction step". In addition, Step S60 in FIG. 11 is an example of a "temperature data acquisition step". In addition, Steps S80, S90, S100, S110, S120, and S130 of FIG. 11 are examples of a "correction value calculation step".

1-6. Measurement Example

Next, a measurement example of the sensor module 2 according to the present embodiment will be described in comparison with a measurement example of the sensor module according to the comparative example. The sensor module according to the comparative example is the same as the sensor module 2 except that the correction value calculation portion 213 does not calculate the second X axis correction value, the second Y axis correction value, and the second Z axis correction value.

Figure 12:
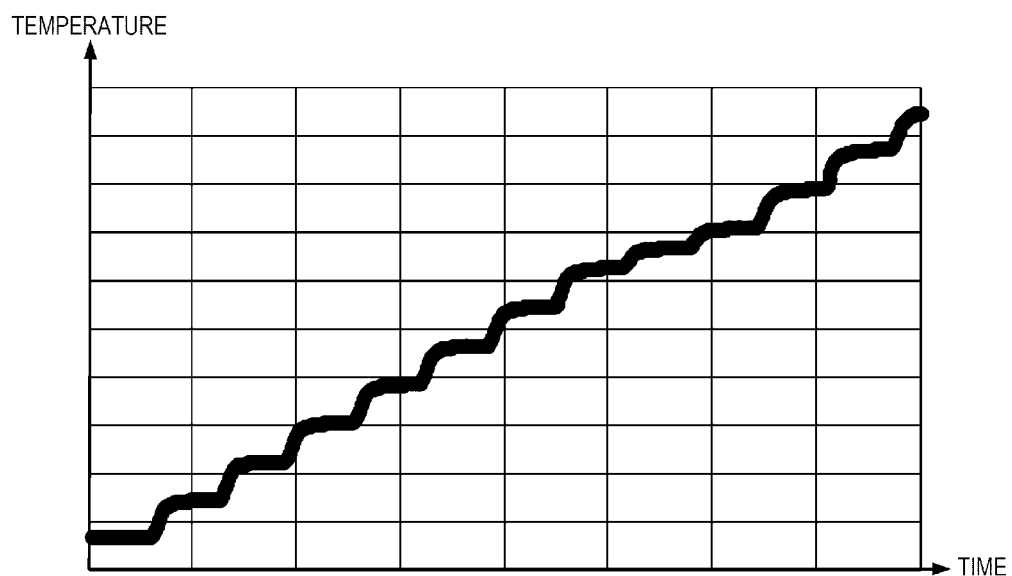
FIG. 12 is a graph illustrating temperature settings in actual measurement.
Figure 13:
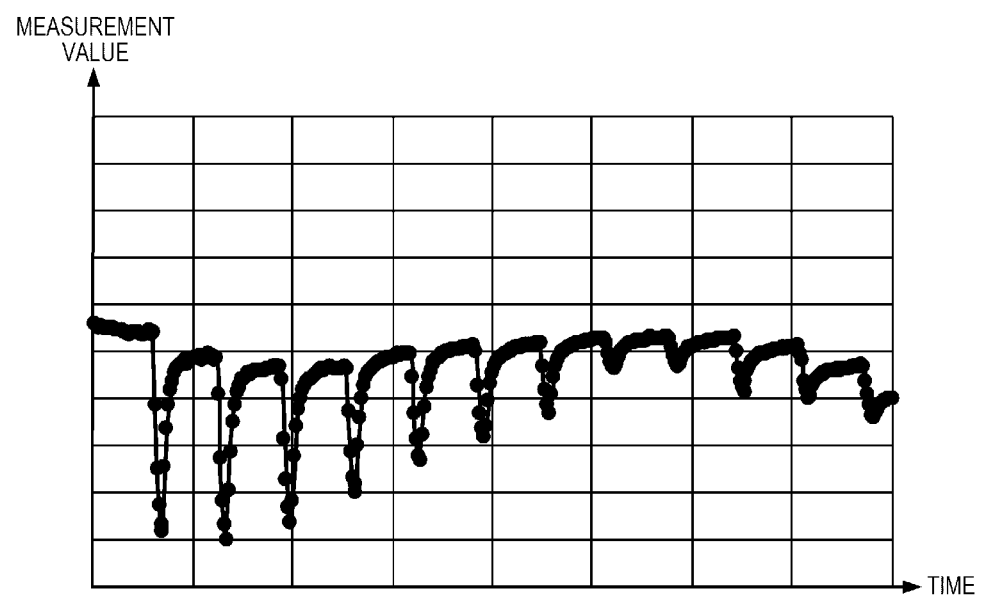
FIG. 13 is a graph illustrating an actual measurement result of a physical quantity by a sensor module according to a comparative example.
Figure 14:
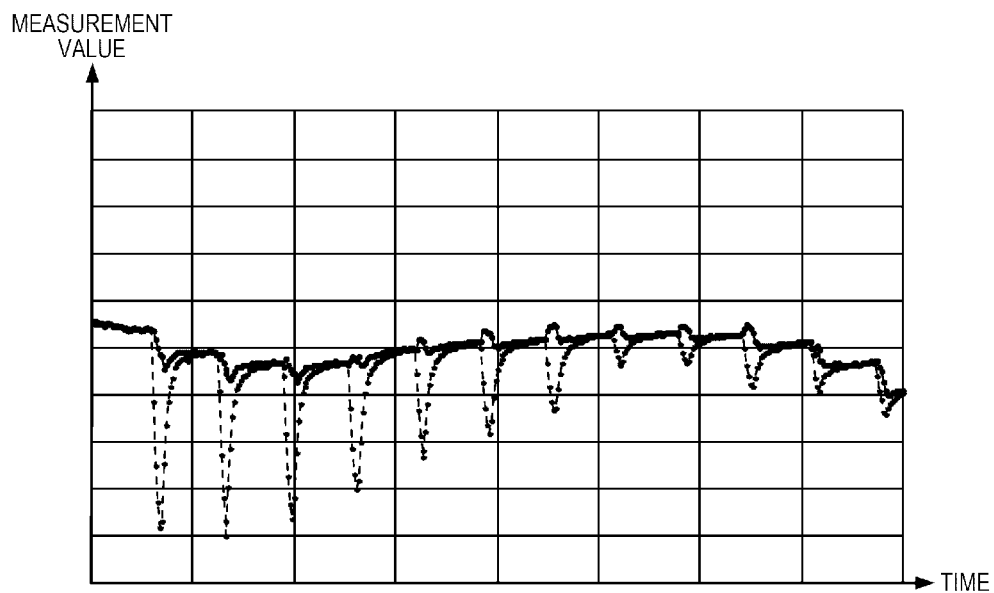
FIG. 14 is a graph illustrating an actual measurement result of a physical quantity by a sensor module according to a first embodiment.

When the sensor module according to the comparative example was accommodated in a thermostatic chamber and the temperature of the thermostatic chamber was changed stepwise as illustrated in FIG. 12, an actual measurement result illustrated in FIG. 13 was obtained. In addition, when the sensor module 2 according to the present embodiment was accommodated in the thermostatic chamber, and the temperature of the thermostatic chamber was changed stepwise as illustrated in FIG. 12, an actual measurement result illustrated in FIG. 14 was obtained. In FIG. 12, a horizontal axis is time, and a vertical axis is temperature. In addition, in FIGS. 13 and 14, a horizontal axis represents time, and a vertical axis represents a measurement value after temperature correction. FIGS. 13 and 14 illustrate the measurement results of the physical quantity of any one of the X axis, the Y axis, and the Z axis. In addition, in FIG. 14, broken lines indicating the actual measurement results illustrated in FIG. 13 are superimposed.

As illustrated in FIG. 13, in the sensor module according to the comparative example, the measurement value fluctuates significantly at the timing when the temperature of the thermostatic chamber changes. That is, in the sensor module according to the comparative example, the accuracy of the measurement value decreases when the environmental temperature changes sharply.

In the sensor module 2 according to the present embodiment, the coefficient value A and the constant value B in Equation (4) are set to optimum values based on the actual measurement result illustrated in FIG. 13. For example, in the actual measurement result illustrated in FIG. 13, the higher the temperature of the thermostatic chamber, the smaller the fluctuation amount of the measurement value at the timing when the temperature changes, so that the sensor module 2 sets the coefficient value A to a negative value. As illustrated in FIG. 14, in the sensor module 2 according to the present embodiment, the fluctuation of the measurement value at the timing when the temperature of the thermostatic chamber changes is significantly small. That is, in the sensor module according to the comparative example, there is almost no decrease in the accuracy of the measurement value when the environmental temperature changes sharply.

Figure 15:
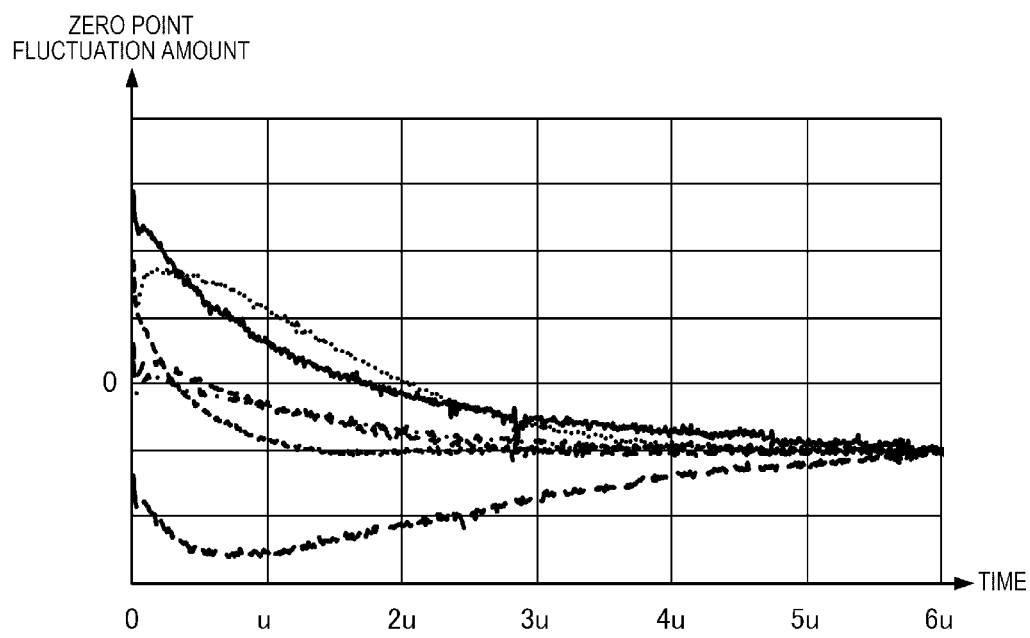
FIG. 15 is a graph illustrating an actual measurement result of a starting time of the sensor module according to the comparative example.
Figure 16:
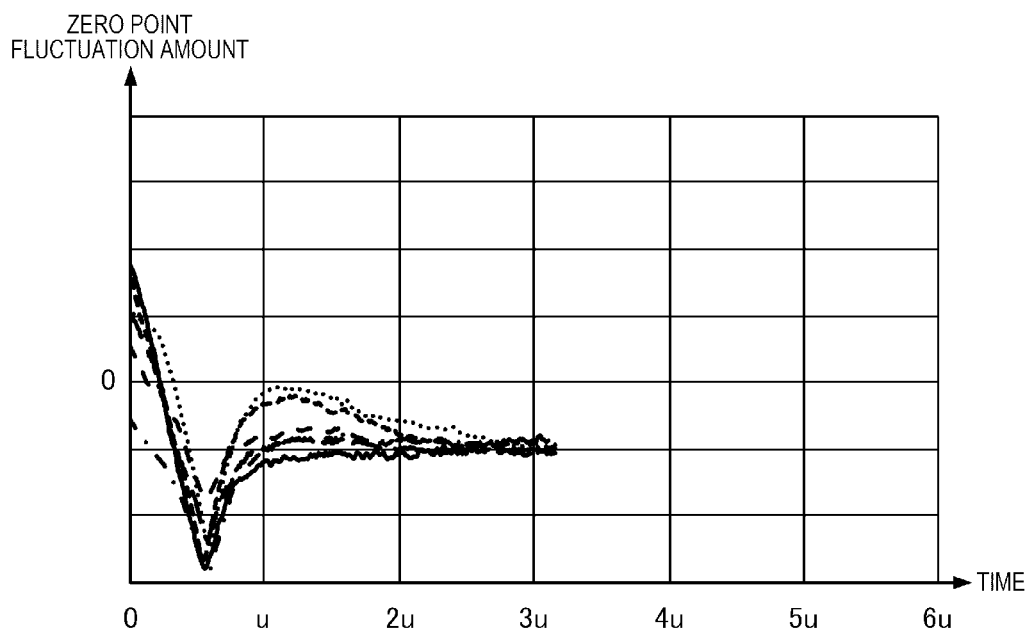
FIG. 16 is a graph illustrating an actual measurement result of a starting time of the sensor module according to the first embodiment.

In addition, as illustrated in FIGS. 15 and 16, it was found that the sensor module 2 according to the present embodiment has a secondary effect that a starting time is shorter than that of the sensor module according to the comparative example. In FIGS. 15 and 16, a horizontal axis is time, and a vertical axis is the fluctuation amount in the measurement value with respect to the zero point. FIG. 15 illustrates measurement results for five samples of the sensor module according to the comparative example, and FIG. 16 illustrates measurement results for five samples of the sensor module 2.

As illustrated in FIG. 15, the sensor module according to the comparative example has a starting time of approximately 6 u from the start of starting until the zero point fluctuation amount of the measurement value is almost zero, while the sensor module 2 of the present embodiment has a starting time of approximately 3 u as illustrated in FIG. 16. That is, the starting time of the sensor module 2 according to the present embodiment is shortened to approximately half of the starting time of the sensor module according to the comparative example.

1-7. Operational Effects

As described above, in the first embodiment, the microcontroller 210 of the sensor module 2 functions as the temperature correction device including the data acquisition portion 211 that acquires the physical quantity data based on the output signals from the physical quantity sensors 200X, 200Y, and 200Z and the temperature data based on the output signal from the temperature sensor 204, the physical quantity measurement portion 212 that measures the physical quantities detected by the physical quantity sensors 200X, 200Y, and 200Z based on the physical quantity data, the correction value calculation portion 213 that calculates the second correction value $\Delta C2(n)$ based on the product of the temperature gradient value $\Delta T_a(n)$ for the first period $P1(n)$ from the first time $t(n-p)$ to the second time $t(n)$ obtained based on the temperature data and the correction coefficient value $E(n)$, and the correction portion 214 that corrects the measurement value of the physical quantity measured by the physical quantity measurement portion 212 based on the second correction value $\Delta C2(n)$. In the temperature correction device, when the temperature changes sharply, an absolute value of the temperature gradient value $\Delta T_a(n)$ for the first period $P1(n)$ increases, and an absolute value of the second correction value $\Delta C2(n)$ based on the product of the temperature gradient value $\Delta T_a(n)$ and the correction coefficient value $E(n)$ also increases. The correction portion 214 does not correct the temperature data based on the second correction value $\Delta C2(n)$, but directly corrects the measurement value of the physical quantity, so that temperature correction is realized that takes into account not only the temperature gradient between the temperature sensor 204 and the physical quantity sensors 200X, 200Y, and 200Z, but also the temperature gradient inside the physical quantity sensors 200X, 200Y, and 200Z. Therefore, according to the first embodiment, it is possible to provide the temperature correction device capable of correcting the measurement error of the physical quantity based on the output signals of the physical quantity sensors 200X, 200Y, and 200Z when the temperature changes sharply with higher accuracy than in the related art.

In addition, in the first embodiment, the correction value calculation portion 213 calculates the temperature value $T(n-p)$ at the first time $t(n-p)$ and the temperature value $T(n)$ at the second time $t(n)$, based on a plurality of pieces of the temperature data acquired by the data acquisition portion 211 in the first period $P1(n)$, and calculates the temperature gradient value $\Delta T_a(n)$ for the first period $P1(n)$, based on the difference $\Delta T(n)$ between the temperature value $T(n)$ at the second time $t(n)$ and the temperature value $T(n-p)$ at the first time $t(n-p)$. Specifically, the correction value calculation portion 213 calculates the temperature gradient value $\Delta T_a(n)$ for the first period $P1(n)$ by calculating the sum of p+1 pieces of differences $\Delta T(n-p)$ to $\Delta T(n)$ by Equation (3). Accordingly, since noise components included in the differences $\Delta T(n-p)$ to $\Delta T(n)$ are averaged, the noise components included in the measurement value of the physical quantity after temperature correction are reduced according to the first embodiment.

In addition, in the first embodiment, the temperature value $T(n-p)$ at the first time $t(n-p)$ is the sum of the values of q pieces of temperature data acquired by the data acquisition portion 211 in the second period $P2(n)$ from the third time $t(n-p-1)$ to the first time $t(n-p)$. The temperature value $T(n)$ at the second time is a sum of values of q pieces of temperature data acquired by the data acquisition portion 211 in the third period $P3$ from the fourth time $t(n-1)$ to the second time $t(n)$. Therefore, since the 1-bit resolution of the temperature value $T(n-p)$ at the first time $t(n-p)$ and the temperature value $T(n)$ at the second time is improved, according to the first embodiment, the noise components included in the measurement value of the physical quantity after temperature correction are reduced.

In addition, in the first embodiment, as illustrated to Equation (4), the correction coefficient value $E(n)$ is a polynomial value having a sum of values of a plurality of pieces of the temperature data acquired by the data acquisition portion 211 in the fourth period $P4(n)$ as a variable. Therefore, according to the first embodiment, even when the error in the measurement value of the physical quantity due to the rapid change in temperature has temperature dependence, in consideration of the temperature dependence, the measurement value of the physical quantity can be temperature-corrected with high accuracy.

2. Second Embodiment

Hereinafter, in a sensor module of a second embodiment, the same reference numerals are given to the same components as those of the first embodiment. The contents different from the first embodiment will be mainly described, and the description overlapping with the first embodiment will be omitted or simplified.

Since a structure and functional blocks of the sensor module 2 of the second embodiment are the same as those of the first embodiment, illustration and description thereof are omitted. In the sensor module 2 of the second embodiment, processing of the correction value calculation portion 213 is different from that of the first embodiment.

In the second embodiment, the correction value calculation portion 213 calculates k pieces of sub-correction values $\Delta Cd(n+1/k)$ to $\Delta Cd(n+k/k)$ that monotonously increase or monotonously decrease for k pieces of sections in which a cycle Q for calculating the second correction value $\Delta C2(n)$ is divided, based on the second correction value $\Delta C2(n)$. k is an integer of 2 or more. The correction portion 214 performs the temperature correction on the measurement value of the physical quantity measured by the physical quantity measurement portion 212, based on the k pieces of sub-correction values ΔCd(n+1/k) to ΔCd(n+k/k) calculated by the correction value calculation portion 213. The correction portion 214 may perform the temperature correction on the measurement value of the physical quantity by adding a m-th sub-correction value ΔCd(n+m/k) to the measurement value of the physical quantity in a m-th section of the k pieces of sections. m is an integer from 1 to k.

Figure 17:
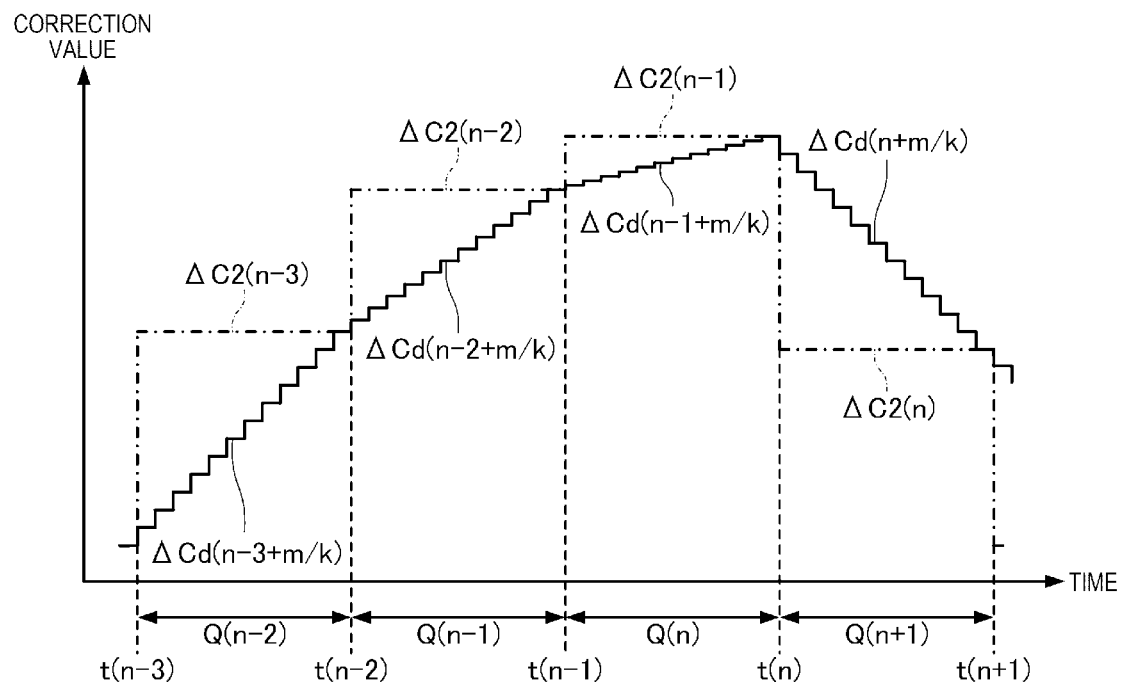
FIG. 17 is a graph illustrating an example of a correction coefficient value in a sensor module according to a second embodiment.

FIG. 17 is a graph illustrating an example of the sub-correction value ΔCd. In FIG. 17, a horizontal axis is time, and a vertical axis is a correction value. In FIG. 17, a solid line indicates the sub-correction value ΔCd, and a one-dot chain line indicates the second correction value ΔC2.

In the example of FIG. 17, the second correction value ΔC2(n) is calculated in a cycle Q(n) immediately before a cycle Q(n+1) divided into k pieces of sections and is used for temperature correction in the cycle Q(n+1). In addition, the second correction value ΔC2(n−1) is calculated in a cycle Q(n−1) immediately before the cycle Q(n) in which the second correction value ΔC2(n) is calculated, and is used for temperature correction in the cycle Q(n). At this time, the m-th sub-correction value ΔCd(n+m/k) is a value of the following equation (6).

$$\Delta Cd\left(n+\frac{m}{k}\right) = \frac{m(\Delta C2(n) - \Delta C2(n-1))}{k} + \Delta C2(n-1) \quad (6)$$

That is, the k pieces of sub-correction values ΔCd(n+1/k) to ΔCd(n+k/k) increase or decrease linearly.

Since other configurations of the sensor module 2 of the second embodiment are the same as those of the sensor module 2 of the first embodiment, the description thereof is omitted.

According to the second embodiment, since the resolution of the temperature correction by the sub-correction value ΔCd(n+m/k) is high, the noise components included in the measurement value of the physical quantity after the temperature correction are reduced, and the temperature correction can be performed with higher accuracy than that in the first embodiment.

3. Third Embodiment

Hereinafter, in a sensor module of the third embodiment, the same reference numerals are given to the same components as those of the first embodiment or the second embodiment. The contents different from the first embodiment or the second embodiment will be mainly described, and the description overlapping with the first embodiment or the second embodiment will be omitted or simplified.

Since the structure and functional blocks of the sensor module 2 of the third embodiment are the same as those of the first embodiment and the second embodiment, illustration and description thereof are omitted. In the sensor module 2 of the third embodiment, a correction coefficient value E(n) calculated by the correction value calculation portion 213 is different from those of the first embodiment and the second embodiment.

In the third embodiment, the correction coefficient value E(n) calculated by the correction value calculation portion 213 is a polynomial value having a sum of values of a plurality of pieces of the temperature data acquired by the data acquisition portion 211 in the fourth period P4(n) as a variable. The polynomial when the temperature gradient value ΔT$_a$(n) is in a first range is different from the polynomial when the temperature gradient value ΔT$_a$(n) is in a second range.

For example, the correction value calculation portion 213 may calculate a correction coefficient value E(n) expressed by the following equation (7). In Equation (7), for example, a range where the temperature gradient value ΔT$_a$(n) is smaller than ΔT1 or a range where the temperature gradient value ΔT$_a$(n) is ΔT1 or greater and ΔT2 or less is the first range, and a range where the temperature gradient value ΔT$_a$(n) is larger than ΔT2 is the second range. In Equation (7), the polynomial of the correction coefficient value E(n) in the range where the temperature gradient value ΔT$_a$(n) is larger than ΔT2 is the same as Equation (4). In addition, for example, the constant value C is larger than the constant value B.

$$E(n) = \begin{cases} A \cdot \sum_{i=n-r}^{n} T(n) & (\Delta T_a(n) < \Delta T1) \\ A \cdot \sum_{i=n-r}^{n} T(n) + C & (\Delta T1 \leq \Delta T_a(n) \leq \Delta T2) \\ A \cdot \sum_{i=n-r}^{n} T(n) + B & (\Delta T_a(n) > \Delta T2) \end{cases} \quad (7)$$

Figure 18:
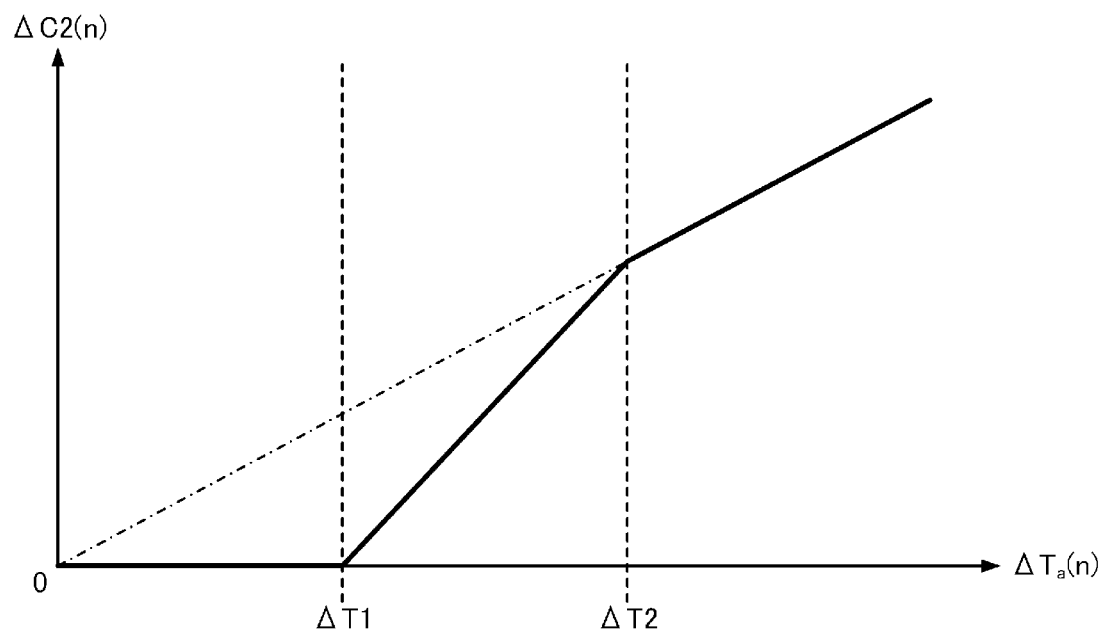
FIG. 18 is a graph illustrating an example of a second correction value in a sensor module according to a third embodiment.

FIG. 18 is a graph illustrating an outline of the second correction value ΔC2(n) calculated using the correction coefficient value E(n) represented by Equation (7). In FIG. 18, a horizontal axis represents the temperature gradient value ΔT$_a$(n), and a vertical axis represents the second correction value ΔC2(n). In FIG. 18, a solid line indicates the second correction value ΔC2(n) calculated in the third embodiment, and a one-dot chain line indicates the second correction value ΔC2(n) calculated in the first embodiment. As illustrated in FIG. 18, in a range where the temperature gradient value ΔT$_a$(n) is smaller than ΔT1, the second correction value ΔC2(n) changes with a zero-order polynomial with respect to the temperature gradient value ΔT$_a$(n). In addition, in a range where the temperature gradient value ΔT$_a$(n) is ΔT1 or greater and ΔT2 or less, the second correction value ΔC2(n) changes with a first-order polynomial with respect to the temperature gradient value ΔT$_a$(n). Similarly, even in a range where the temperature gradient value ΔT$_a$(n) is larger than ΔT2, the second correction value ΔC2(n) changes with a first-order polynomial with respect to the temperature gradient value ΔT$_a$(n).

In addition, for example, the correction value calculation portion 213 may calculate a correction coefficient value E(n) represented by the following equation (8). In Equation (8), for example, a range where the temperature gradient value ΔT$_a$(n) is smaller than ΔT1 or a range where the temperature gradient value ΔT$_a$(n) is ΔT1 or greater and ΔT2 or less is the first range, and a range where the temperature gradient value ΔT$_a$(n) is larger than ΔT2 is the second range. In Equation (8), the polynomial of the correction coefficient value E(n) in the range where the temperature gradient value ΔT$_a$(n) is larger than ΔT2 is the same as Equation (4).

$$E(n) = \begin{cases} A \cdot \sum_{i=n-r}^{n} T(n) + a \cdot \Delta T_a(n) & (\Delta T_a(n) < \Delta T1) \\ A \cdot \sum_{i=n-r}^{n} T(n) + b \cdot \Delta T_a(n) + c & (\Delta T1 \leq \Delta T_a(n) \leq \Delta T2) \\ A \cdot \sum_{i=n-r}^{n} T(n) + B & (\Delta T_a(n) > \Delta T2) \end{cases} \quad (8)$$

Figure 19:
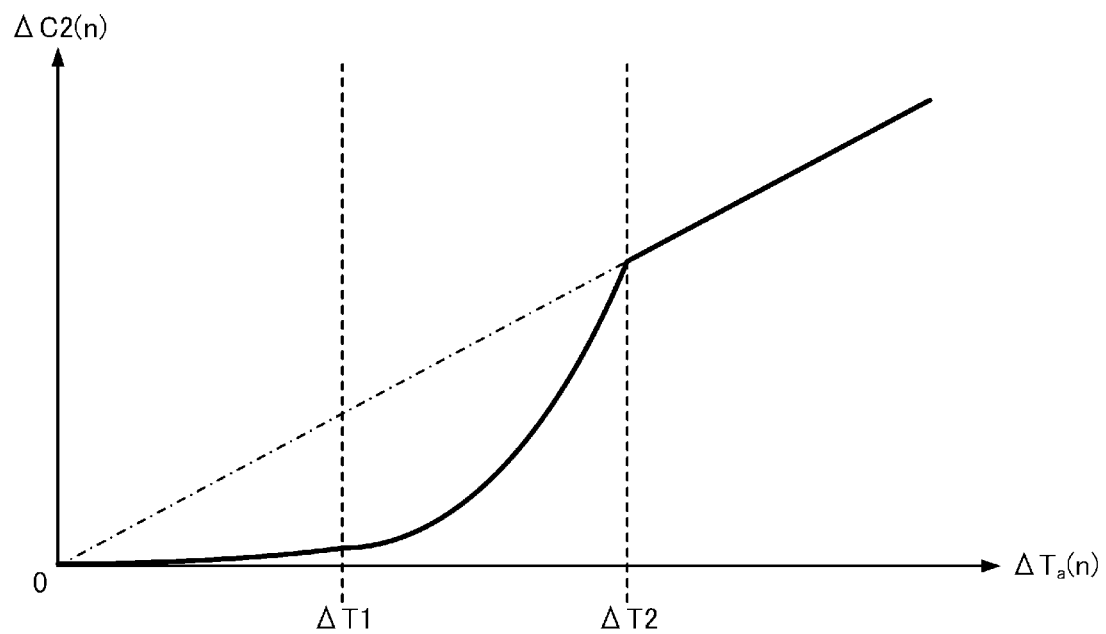
FIG. 19 is a graph illustrating another example of the second correction value in the sensor module according to the third embodiment.

FIG. 19 is a graph illustrating an outline of the second correction value ΔC2(n) calculated using the correction coefficient value E(n) represented by Equation (8). In FIG. 19, a horizontal axis is the temperature gradient value $\Delta T_a(n)$, and a vertical axis is the second correction value ΔC2(n). In FIG. 19, a solid line indicates the second correction value ΔC2(n) calculated in the third embodiment, and a one-dot chain line indicates the second correction value ΔC2(n) calculated in the first embodiment. As illustrated in FIG. 19, in a range where the temperature gradient value $\Delta T_a(n)$ is smaller than ΔT1, the second correction value ΔC2(n) changes with a second-order polynomial with respect to the temperature gradient value $\Delta T_a(n)$. Similarly, even when the temperature gradient value $\Delta T_a(n)$ is in the range of ΔT1 to ΔT2, the second correction value ΔC2(n) changes with a second-order polynomial with respect to the temperature gradient value $\Delta T_a(n)$. In addition, in the range where the temperature gradient value $\Delta T_a(n)$ is larger than ΔT2, the second correction value ΔC2(n) changes with a first-order polynomial with respect to the temperature gradient value $\Delta T_a(n)$.

In addition, for example, the correction value calculation portion 213 may calculate the correction coefficient value E(n) represented by the following equation (9). In Equation (8), for example, a range where the temperature gradient value $\Delta T_a(n)$ is smaller than ΔT2 is a first range, and a range where the temperature gradient value $\Delta T_a(n)$ is larger than ΔT2 is a second range. In Equation (9), the polynomial of the correction coefficient value E(n) in the range where the temperature gradient value $\Delta T_a(n)$ is larger than ΔT2 is the same as Equation (4).

$$E(n) = \begin{cases} A \cdot \sum_{i=n-r}^{n} T(n) + a \cdot \Delta T_a(n)^2 + b \cdot \Delta T_a(n) + c & (\Delta T_a(n) < \Delta T2) \\ A \cdot \sum_{i=n-r}^{n} T(n) + B & (\Delta T_a(n) \geq \Delta T2) \end{cases} \quad (9)$$

Figure 20:
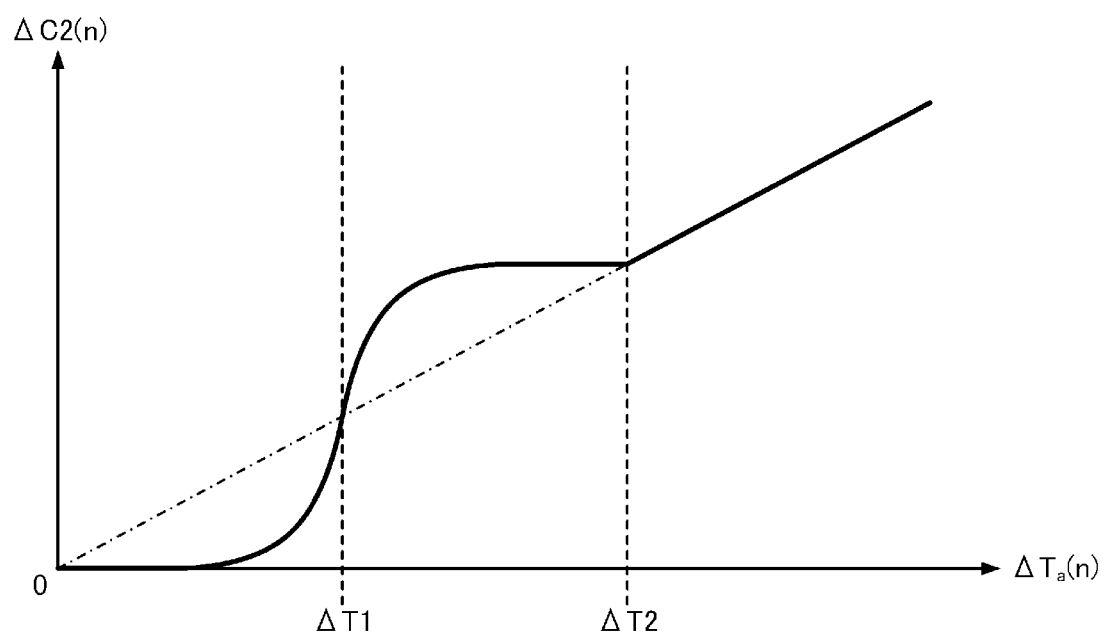
FIG. 20 is a graph illustrating another example of the second correction value in the sensor module according to the third embodiment.

FIG. 20 is a graph illustrating an outline of the second correction value ΔC2(n) calculated using the correction coefficient value E(n) represented by Equation (9). In FIG. 20, a horizontal axis is the temperature gradient value $\Delta T_a(n)$, and a vertical axis is the second correction value ΔC2(n). In FIG. 20, a solid line indicates the second correction value ΔC2(n) calculated in the third embodiment, and a one-dot chain line indicates the second correction value ΔC2(n) calculated in the first embodiment. As illustrated in FIG. 20, in a range where the temperature gradient value $\Delta T_a(n)$ is smaller than ΔT2, the second correction value ΔC2(n) changes with a third-order polynomial with respect to the temperature gradient value $\Delta T_a(n)$. In addition, in the range where the temperature gradient value $\Delta T_a(n)$ is larger than ΔT2, the second correction value ΔC2(n) changes with a first-order polynomial with respect to the temperature gradient value $\Delta T_a(n)$.

In the examples of FIGS. 18 and 19, the polynomial of the second correction value ΔC2(n) is different in three ranges of the temperature gradient value $\Delta T_a(n)$. In the example of FIG. 20, the polynomial of the second correction value ΔC2(n) is different in the two ranges of the temperature gradient value $\Delta T_a(n)$. The polynomial of the second correction value ΔC2(n) may be different in the range of four or more temperature gradient values $\Delta T_a(n)$. In addition, the polynomial of the second correction value ΔC2(n) may be a fourth or higher order polynomial.

Since other configurations of the sensor module 2 of the third embodiment are the same as those of the sensor module 2 of the first embodiment or the second embodiment, the description thereof is omitted.

In the third embodiment, as illustrated in FIGS. 18, 19 and 20, since the second correction value ΔC2(n) calculated by the correction value calculation portion 213 in a range where the temperature gradient value $\Delta T_a(n)$ is smaller than ΔT1 is smaller than the second correction value ΔC2(n) in the first embodiment indicated by the one-dot chain line, the effect of the correction by the second correction value ΔC2(n) on the measurement value of the physical quantity is small. Therefore, according to the third embodiment, when the temperature does not change sharply, the possibility that the measurement value of the physical quantity is excessively corrected is reduced, and the temperature correction can be performed with higher accuracy than that in the first embodiment or the second embodiment.

4. Modification Example

The present disclosure is not limited to the present embodiment, and various modifications can be made within the scope of the gist of the present disclosure.

For example, in each of the above embodiments, the sensor module 2 includes three physical quantity sensors 200, and the number of the physical quantity sensors 200 included in the sensor module 2 may be one, two, or four or more.

In addition, in each of the above embodiments, the sensor module 2 provided with an acceleration sensor as the physical quantity sensor 200 is described as an example. The sensor module 2 may be provided with a physical quantity sensor whose output changes depending on the temperature, such as an angular velocity sensor, a pressure sensor, and an optical sensor, as the physical quantity sensor 200. In addition, the sensor module 2 may be provided with two or more types of physical quantity sensors among various physical quantity sensors such as an acceleration sensor, an angular velocity sensor, a pressure sensor, and an optical sensor.

In addition, in each of the above embodiments, an element configured using a crystal as a physical quantity detection element included in the physical quantity sensor 200 is described as an example. The physical quantity detection element may be configured using a piezoelectric element other than crystal, or may be an electrostatic capacitance type micro electro mechanical systems (MEMS) element.

In addition, in each of the above embodiments, the correction value calculation portion 213 calculates the second correction value ΔC2(n) based on the temperature gradient value $\Delta T_a(n)$, and may calculate the second correction value ΔC2(n) based on the temperature gradient value $\Delta T_a(n)$ and a change rate $\Delta\Delta T_a(n)$ of the temperature gradient value $\Delta T_a(n)$.

For example, the correction value calculation portion 213 calculates s+1 pieces of differences ΔΔT(n−s) to ΔΔT(n) by using the s+1 pieces of differences ΔT(n−s) to ΔT(n) held in the register portion 215 by the following equation (10), and holds the differences in the register portion 215. In Equation (10), j is an integer of n−s to n.

$$\Delta\Delta T(j) = \Delta T(j) - \Delta T(j-s) \quad (10)$$

Next, the correction value calculation portion 213 calculates the change rate $\Delta\Delta T_a(n)$ of the temperature gradient value by calculating the sum of s+1 pieces of differences ΔΔT(n−s) to ΔΔT(n) held in the register portion 215 by the following equation (11).

$$\Delta\Delta T_a(n) = \sum_{i=n-p}^{n} \Delta\Delta T(i) \qquad (11)$$

For example, the correction value calculation portion 213 may calculate the second correction value ΔC2(n) based on the temperature gradient value $\Delta T_a(n)$ and the change rate $\Delta\Delta T_a(n)$ of the temperature gradient value $\Delta T_a(n)$ by the following equation (12).

$$\Delta C2(n) = \left(A \cdot \sum_{i=n-r}^{n} T(n) + B\right) \cdot \Delta T_a(n) \left(C \cdot \sum_{i=n-r}^{n} T(n) + D\right) \cdot \Delta\Delta T_a(n) \qquad (12)$$

The correction portion 214 uses this second correction value ΔC2(n) to perform temperature correction of the measurement value of the physical quantity, thereby enabling temperature correction with higher accuracy.

The above embodiments and modification examples are merely examples, and the present disclosure is not limited thereto. For example, it is possible to appropriately combine each embodiment and each modification example.

The present disclosure includes configurations that are substantially the same as the configurations described in the embodiments (for example, configurations having the same functions, methods, and results, or configurations having the same objects and effects). In addition, the present disclosure includes a configuration in which a non-essential part of the configuration described in the embodiment is replaced. In addition, the present disclosure includes a configuration that exhibits the same operational effects as the configuration described in the embodiment or a configuration that can achieve the same object. In addition, the present disclosure includes a configuration in which a known technique is added to the configuration described in the embodiment.

What is claimed is:

1. A temperature correction device comprising:
   a data acquisition portion that acquires physical quantity data based on an output signal from a physical quantity sensor and temperature data based on an output signal from a temperature sensor;
   a physical quantity measurement portion that measures a physical quantity detected by the physical quantity sensor based on the physical quantity data;
   a correction value calculation portion that calculates a correction value based on a correction coefficient value and a product of a temperature gradient value for a first period from a first time to a second time obtained based on the temperature data; and
   a correction portion that corrects a measurement value of the physical quantity measured by the physical quantity measurement portion based on the correction value, wherein
   the correction value calculation portion calculates a temperature value at the first time and a temperature value at the second time based on a plurality of pieces of the temperature data acquired by the data acquisition portion in the first period, and
   calculates the temperature gradient value for the first period based on a difference between the temperature value at the second time and the temperature value at the first time.

2. The temperature correction device according to claim 1, wherein
   the temperature value at the first time is a sum of values of a plurality of pieces of the temperature data acquired by the data acquisition portion in a second period, and
   the temperature value at the second time is a sum of values of a plurality of pieces of the temperature data acquired by the data acquisition portion in a third period.

3. The temperature correction device according to claim 1, wherein
   the correction coefficient value is a polynomial value having a sum of values of a plurality of pieces of the temperature data acquired by the data acquisition portion in a fourth period as a variable.

4. The temperature correction device according to claim 3, wherein
   the polynomial when the temperature gradient value is in a first range and the polynomial when the temperature gradient value is in a second range are different from each other.

5. A sensor module comprising:
   the temperature correction device according to claim 1; and
   the physical quantity sensor.

6. The sensor module according to claim 5, wherein the physical quantity sensor is an acceleration sensor.

7. A temperature correction device comprising:
   a data acquisition portion that acquires physical quantity data based on an output signal from a physical quantity sensor and temperature data based on an output signal from a temperature sensor;
   a physical quantity measurement portion that measures a physical quantity detected by the physical quantity sensor based on the physical quantity data;
   a correction value calculation portion that calculates a correction value based on a correction coefficient value and a product of a temperature gradient value for a first period from a first time to a second time obtained based on the temperature data; and
   a correction portion that corrects a measurement value of the physical quantity measured by the physical quantity measurement portion based on the correction value, wherein
   the correction value calculation portion periodically calculates the correction value, and calculates k pieces of sub-correction values that monotonously increase or monotonously decrease for k pieces of sections into which a cycle for calculating the correction value is divided based on the correction value, where k is an integer of 2 or greater, and
   the correction portion corrects the measurement value of the physical quantity based on the k pieces of sub-correction values.

8. The temperature correction device according to claim 7, wherein
   when the correction value calculated in a cycle immediately before the cycle divided into the k pieces of sections is ΔC2(n), and the correction value calculated in a cycle immediately before the cycle in which ΔC2(n) is calculated is ΔC2(n−1), a m-th sub-correction value of the k pieces of sub-correction values is $(\Delta C2(n)-\Delta C2(n-1)) \times m/k+\Delta C2(n-1)$, where m is an integer from 1 to k.

9. A temperature correction method comprising:

a physical quantity data acquisition step of acquiring physical quantity data based on an output signal from a physical quantity sensor;

a physical quantity measurement step of measuring a physical quantity detected by the physical quantity sensor based on the physical quantity data;

a temperature data acquisition step of acquiring temperature data based on an output signal from a temperature sensor;

a correction value calculation step of calculating a correction value based on a correction coefficient value and a product of a temperature gradient value for a first period from a first time to a second time obtained based on the temperature data; and a correction step of correcting a measurement value of the physical quantity measured in the physical quantity measurement step based on the correction value, wherein the correction coefficient value is a polynomial value having a sum of values of a plurality of pieces of the temperature data acquired by the data acquisition portion in a fourth period as a variable.

* * * * *